United States Patent
Yang et al.

(10) Patent No.: US 10,736,080 B2
(45) Date of Patent: Aug. 4, 2020

(54) BROADCAST SIGNAL TRANSMISSION/RECEPTION DEVICE AND METHOD

(71) Applicant: LG ELECTRONICS INC., Seoul (KR)

(72) Inventors: Seungryul Yang, Seoul (KR); Minsung Kwak, Seoul (KR); Woosuk Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/343,319

(22) PCT Filed: Jun. 20, 2017

(86) PCT No.: PCT/KR2017/006482
§ 371 (c)(1),
(2) Date: Apr. 18, 2019

(87) PCT Pub. No.: WO2018/074694
PCT Pub. Date: Apr. 26, 2018

(65) Prior Publication Data
US 2020/0187160 A1    Jun. 11, 2020

Related U.S. Application Data

(60) Provisional application No. 62/410,832, filed on Oct. 20, 2016, provisional application No. 62/421,357, (Continued)

(51) Int. Cl.
*H04W 72/00*   (2009.01)
*H04W 28/02*   (2009.01)
*H04L 12/18*   (2006.01)

(52) U.S. Cl.
CPC ....... *H04W 72/005* (2013.01); *H04L 12/1886* (2013.01); *H04W 28/0252* (2013.01)

(58) Field of Classification Search
CPC ............ H04W 72/005; H04W 28/0252; H04L 12/1886
See application file for complete search history.

(56) References Cited

U.S. PATENT DOCUMENTS

2014/0112273 A1   4/2014  Aboul-Magd et al.
2016/0226939 A1*  8/2016  Kwak ................. H04L 65/4076
(Continued)

FOREIGN PATENT DOCUMENTS

WO   2015137727 A1   9/2015
WO   2015156625 A1   10/2015
(Continued)

OTHER PUBLICATIONS

ATSC Candidate Standard: Signaling, Delivery, Synchronization, and Error Protection (A/331), Doc. S33-174r1; Jan. 5, 2016.*
(Continued)

*Primary Examiner* — Jae Y Lee
(74) *Attorney, Agent, or Firm* — Dentons US LLP

(57) ABSTRACT

Disclosed is a broadcast signal transmission method. The broadcast signal transmission method comprises the steps of: processing at least one component of a broadcast service on the basis of a delivery protocol; generating service layer signaling (SLS) information including information for discovering and acquiring the at least one component of the broadcast service; generating service list table (SLT) information including bootstrap information for acquiring the SLS information; and performing physical layer processing of the at least one component, the SLS information, and the SLT information on the basis of a physical layer pipe (PLP).

15 Claims, 22 Drawing Sheets

Related U.S. Application Data filed on Nov. 13, 2016, provisional application No. 62/426,236, filed on Nov. 24, 2016, provisional application No. 62/428,486, filed on Nov. 30, 2016.

(56) References Cited

U.S. PATENT DOCUMENTS

| | | | |
|---|---|---|---|
| 2016/0234355 A1* | 8/2016 | Lee | H04L 65/80 |
| 2016/0234532 A1* | 8/2016 | Lee | H04N 21/2381 |
| 2016/0241924 A1* | 8/2016 | Kwak | H04N 21/8586 |
| 2016/0255394 A1* | 9/2016 | Yang | H04N 21/4345 725/131 |
| 2018/0026846 A1* | 1/2018 | Walker | H04H 20/423 370/228 |
| 2019/0261253 A1* | 8/2019 | Deshpande | H04H 20/93 |

FOREIGN PATENT DOCUMENTS

| | | |
|---|---|---|
| WO | 2016093537 A1 | 6/2016 |
| WO | 2016144072 A1 | 9/2016 |

OTHER PUBLICATIONS

Advanced Television Systems Committee, "ATSC Data Broadcast Standard", Doc. A/90:2013, Oct. 28, 2013.
ATSC Candidate Standard: Signaling, Delivery, Synchronization, and Error Protection (A/331), Doc. S33-174r1; Jan. 5, 2016; Washington D.C. (131 pages).

* cited by examiner

FIG. 3

| Syntax | No. of Bits | Format |
|---|---|---|
| LLS_table( ) { | | |
|    LLS_table_id | 8 | uimsbf |
|    provider_id | 8 | uimsbf |
|    LLS_table_version | 8 | uimsbf |
|    switch (LLS_table_id) { | | |
|      case 0x01: | | |
|        SLT | var | Sec. 6.3 |
|        break; | | |
|      case 0x02: | | |
|        RRT | var | See Annex F |
|        break; | | |
|      case 0x03: | | |
|        System Time | var | Sec. 6.4 |
|        break; | | |
|      case 0x04: | | |
|        CAP | var | Sec. 6.5 |
|        break; | | |
|      default: | | |
|        reserved | var | |
|    } | | |
| } | | | t3010

| Element or Attribute Name | Use | Data Type |
|---|---|---|
| SLT | | |
|   @bsid | 1 | unsignedShort |
|   @sltCapabilities | 0..1 | string |
|   sltInetUrl | 0..1 | anyURL |
|     @urlType | 1 | unsignedByte |
|   Service | 1..N | |
|     @serviceID | 1 | unsignedShort |
|     @sltSvcSeqNum | 1 | unsignedByte |
|     @protected | 0..1 | boolean |
|     @majorChannelNo | 0..1 | 1...999 |
|     @minorChannelNo | 0..1 | 1...999 |
|     @serviceCategory | 1 | unsignedByte |
|     @shortServiceName | 0..1 | string |
|     @hidden | 0..1 | boolean |
|     @broadbandAccessRequired | 0..1 | boolean |
|     @svcCapabilities | 0..1 | string |
|     BroadcastSvcSignaling | 0..1 | |
|       @slsProtocol | 1 | unsignedByte |
|       @slsMajorProtocolVersion | 1 | unsignedByte |
|       @slsMinorProtocolVersion | 1 | unsignedByte |
|       @slsPlpID | 0..1 | unsignedByte |
|       @slsDestinationIpAddress | 1 | string |
|       @slsDestinationUdpPort | 1 | unsignedShort |
|       @slsSourceIpAddress | 1 | string |
|     svcInetUrl | 0..N | anyURL |
|       @urlType | 1 | unsignedByte | t3020

FIG. 4

| Element or Attribute Name | Use | Data Type |
|---|---|---|
| bundleDescription | | |
|   userServiceDescription | | |
|     @globalServiceID | 1 | anyURL |
|     @serviceID | 1 | unsignedShort |
|     @serviceStatus | 0..1 | boolean |
|     @fullMPDUri | 1 | anyURL |
|     @sTSIDUri | 1 | anyURL |
|     name | 0..N | string |
|       @lang | 1 | language |
|     serviceLanguage | 0..N | language |
|     capabilityCode | 0..1 | string |
|     deliveryMethod | 1..N | |
|       broadcastAppService | 1..N | |
|         basePattern | 1..N | string |
|       unicastAppService | 0..N | |
|         basePattern | 1..N | string | t4010

| Element or Attribute Name | Use | Data Type |
|---|---|---|
| S-TSID | | |
|   @serviceID | 1 | unsignedShort |
|   RS | 1..N | |
|     @bsid | 0..1 | unsignedShort |
|     @sIpAddr | 0..1 | string |
|     @dIpAddr | 0..1 | string |
|     @dport | 0..1 | unsignedShort |
|     @PLPID | 0..1 | unsignedByte |
|     LS | 1..N | |
|       @tsi | 1 | unsignedInt |
|       @PLPID | 0..1 | unsignedByte |
|       @bw | 0..1 | unsignedInt |
|       @startTime | 0..1 | dateTime |
|       @endTime | 0..1 | dateTime |
|       ScrFlow | 0..1 | scrFlowType |
|       RepairFlow | 0..1 | rprFlowType | t4020

FIG. 5

| Element or Attribute Name | | | | | Use |
|---|---|---|---|---|---|
| bundleDescription | | | | | |
| | userServiceDescription | | | | |
| | | @globalServiceID | | | M |
| | | @serviceID | | | M |
| | | Name | | | 0..N |
| | | | @lang | | CM |
| | | serviceLanguage | | | 0..N |
| | | contentAdvisoryRating | | | 0..1 |
| | | Channel | | | 1 |
| | | | @serviceGenre | | 0..1 |
| | | | @serviceIcon | | 1 |
| | | | ServiceDescription | | 0..N |
| | | | | @serviceDescrText | 1 |
| | | | | @serviceDescrLang | 0..1 |
| | | mpuComponent | | | 0..1 |
| | | | @mmtPackageId | | 1 |
| | | | @nextMmtPackageId | | 0..1 |
| | | routeComponent | | | 0..1 |
| | | | @sTSIDUri | | 1 |
| | | | @sTSIDDestinationIpAddress | | 0..1 |
| | | | @sTSIDDestinationUdpPort | | 1 |
| | | | @sTSIDSourceIpAddress | | 1 |
| | | | @sTSIDMajorProtocolVersion | | 0..1 |
| | | | @sTSIDMinorProtocolVersion | | 0..1 |
| | | broadbandComponent | | | 0..1 |
| | | | @fullMPDUri | | 1 |
| | | ComponentInfo | | | 1..N |
| | | | @ComponentType | | 1 |
| | | | @ComponentRole | | 1 |
| | | | @ComponentProtectedFlag | | 0..1 |
| | | | @ComponentId | | 1 |
| | | | @ComponentName | | 0..1 |

FIG. 6
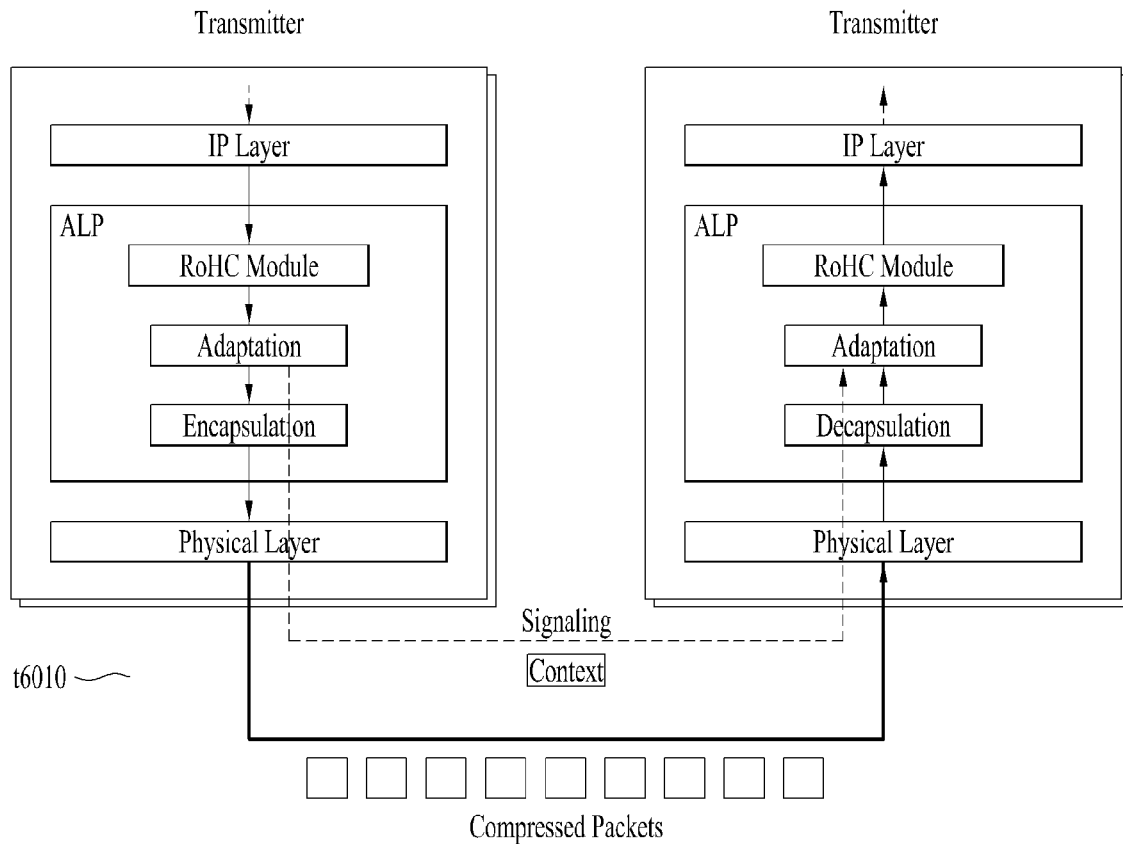
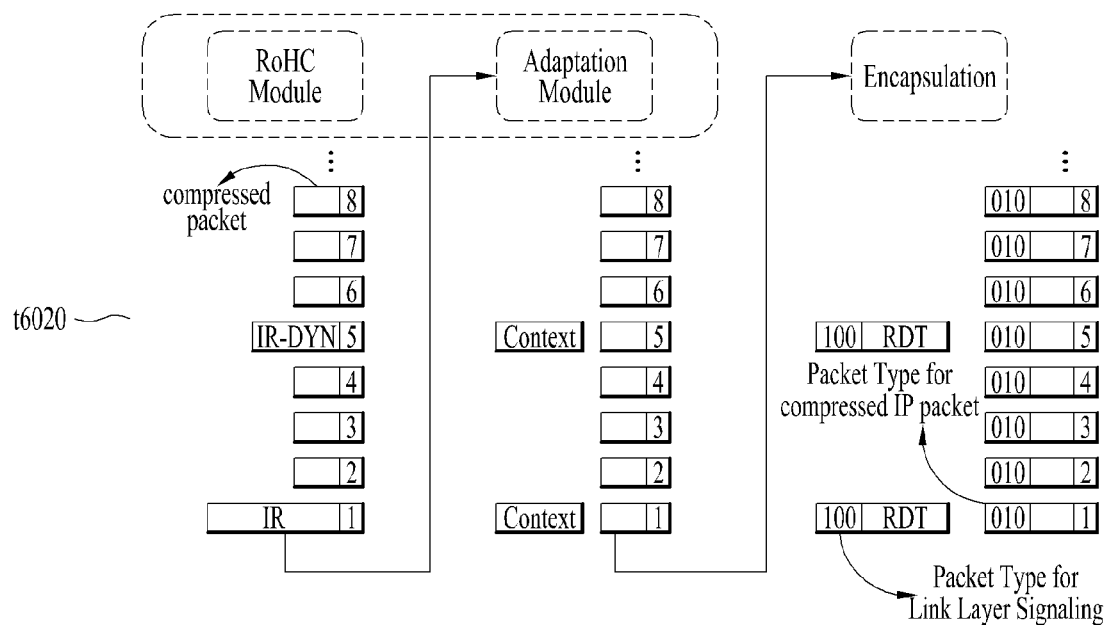

FIG. 7

| Syntax | Number of bits | Format |
|---|---|---|
| Link_Mapping_Table() { | | |
|    signaling_type | 8 | 0x01 |
|    PLP_ID | 6 | uimsbf |
|    reserved | 2 | "11" |
|    num_session | 8 | uimsbf |
|    for(i = 0 ; i < num_session ; i++) { | | |
|       src_IP_add | 32 | uimsbf |
|       dst_IP_add | 32 | uimsbf |
|       src_UDP_port | 16 | uimsbf |
|       dst_UDP_port | 16 | uimsbf |
|       SID_flag | 1 | bslbf |
|       compressed_flag | 1 | bslbf |
|       reserved | 6 | '111111' |
|       if (SID_flag == "1") { | | |
|          SID | 8 | uimsbf |
|       } | | |
|       if (compressed_flag == '1') { | | |
|          context_id | 8 | uimsbf |
|       } | | |
|    } | | |
| } | | |

FIG. 9

| Element or Attribute Name | | | | Use | Data Type | |
|---|---|---|---|---|---|---|
| SLT | | | | | | |
| | @bsid | | | 1 | unsignedShort | |
| | @sltCapabilities | | | 0..1 | string | |
| | sltInetUrl | | | 0..N | anyURI | |
| | | @urlType | | 1 | unsignedByte | |
| | Service | | | 1..N | | |
| | | @serviceId | | 1 | unsignedShort | |
| | | @sltSvcSeqNum | | 1 | unsignedByte | |
| | | @protected | | 0..1 | boolean | |
| | | @majorChannelNo | | 0..1 | 1..999 | |
| | | @minorChannelNo | | 0..1 | 1..999 | |
| | | @serviceCategory | | 1 | unsignedByte | |
| | | @shortServiceName | | 0..1 | string | |
| | | @hidden | | 0..1 | boolean | |
| | | @broadbandAccessRequired | | 0..1 | boolean | |
| | | @svcCapabilities | | 0..1 | string | |
| | | @essential | | 0..1 | boolean | ~9010 |
| | | BroadcastSvcSignaling | | 0..1 | | |
| | | | @slsProtocol | 1 | unsignedByte | |
| | | | @slsMajorProtocolVersion | 1 | unsignedByte | |
| | | | @slsMinorProtocolVersion | 1 | unsignedByte | |
| | | | @slsPlpId | 0..1 | unsignedByte | |
| | | | @slsDestinationIpAddress | 1 | string | |
| | | | @slsDestinationUdpPort | 1 | unsignedShort | |
| | | | @slsSourceIpAddress | 0..1 | string | |
| | | svcInetUrl | | 0..N | anyURI | |
| | | | @urlType | 1 | unsignedByte | |
| | | OtherBsid | | 0..N | unsignedShort | ~9020 |
| | | | @type | 1 | string | ~9030 |
| | | | essential | 0..1 | boolean | ~9040 |

BROADCAST SIGNAL TRANSMISSION/RECEPTION DEVICE AND METHOD

This application is a National Stage Entry of International Application No. PCT/KR2017/006482, filed Jun. 20, 2017, which claims the benefit of and priority to U.S. Provisional Application No. 62/410,832 filed Oct. 20, 2016, U.S. Provisional Application No. 62/421,357 filed Nov. 13, 2016, U.S. Provisional Application No. 62/426,236 filed Nov. 24, 2016, and U.S. Provisional Application No. 62/428,486 filed on Nov. 30, 2016, which is incorporated by reference herein.

TECHNICAL FIELD

The present invention relates to a broadcast signal transmission apparatus, a broadcast signal reception apparatus, a broadcast signal transmission method, and a broadcast signal reception method.

BACKGROUND ART

As analog broadcast signal transmission comes to an end, various technologies for transmitting/receiving digital broadcast signals are being developed. A digital broadcast signal may include a larger amount of video/audio data than an analog broadcast signal and further include various types of additional data in addition to the video/audio data.

DISCLOSURE

Technical Problem

A digital broadcasting system may provide high definition (HD) images, multi-channel audio, and various additional services. For digital broadcasting, however, the transmission efficiency of a large amount of data, robustness of a transmission and reception network, and network flexibility for mobile receivers should be improved.

Technical Solution

To solve the technical problem, the present invention proposes a broadcast signal transmission method and a broadcast signal transmission apparatus.

According to an embodiment of the present invention, a broadcast signal transmission method includes processing at least one component of a broadcast service based on a delivery protocol, the delivery protocol including at least one of real-time object delivery over unidirectional transport (ROUTE) or MPEG media transport (MMT), generating service layer signaling (SLS) information including information for discovering and acquiring the at least one component of the broadcast service, generating service list table (SLT) information including bootstrap information for acquiring the SLS information, and performing physical layer processing on the at least one component, the SLS information, and the SLT information based on a physical layer pipe (PLP). The broadcast service includes a plurality of components, the plurality of components of the broadcast service are transmitted in multiple channels, and a set of the components corresponds to an essential portion enabling presentation of the service, a non-essential portion which is not sufficient to make a presentation of the service, or a duplicate of the service.

In the broadcast signal transmission method according to the embodiment of the present invention, the SLT information includes broadcast stream identifier (BSID) information for a channel carrying the SLT information and service information delivered in a broadcast stream of the channel. The service information includes a service ID identifying the service, information about a channel number of the service, and when the service is transmitted in multiple radio frequency (RF) channels, essential information indicating whether a portion of the service delivered in the broadcast stream is the essential portion.

In the broadcast signal transmission method according to the embodiment of the present invention, the service information includes OtherBSID information identifying another broadcast stream in which another portion of the broadcast service is transmitted, and the OtherBSID information includes type information indicating whether a set of components delivered in the other broadcast stream is a service portion or a service duplicate.

In the broadcast signal transmission method according to the embodiment of the present invention, the physical layer processing further includes performing channel bonding for distributedly transmitting one physical layer pipe (PLP) including a component in first and second channels, and a broadcast signal transmitted in the first channel includes a bonded part and a non-bonded part.

In the broadcast signal transmission method according to the embodiment of the present invention, if the essential portion of the service is delivered in the non-bonded part of the broadcast signal, SLT information of the bonded part and SLT information of the non-bonded part describe the service.

In the broadcast signal transmission method according to the embodiment of the present invention, if the essential portion of the service is delivered in the bonded part of the broadcast signal, only SLT information of the bonded part describes the service.

In the broadcast signal transmission method according to the embodiment of the present invention, only when the SLT information describes the essential portion, the OtherBSID information is included in the SLT.

Further, to solve the technical problem, a broadcast signal transmission apparatus according to an embodiment of the present invention includes a communication unit configured to transmit a broadcast signal, a memory configured to store data, and a processor configured to control the communication unit and the memory. The broadcast signal transmission apparatus is configured to process at least one component of a broadcast service based on a delivery protocol, the delivery protocol including at least one of ROUTE or MMT, to generate SLS information including information for discovering and acquiring the at least one component of the broadcast service, to generate SLT information including bootstrap information for acquiring the SLS information, and to perform physical layer processing on the at least one component, the SLS information, and the SLT information based on a PLP. The broadcast service includes a plurality of components, the plurality of components of the broadcast service are transmitted in multiple channels, and a set of the components corresponds to an essential portion enabling presentation of the service, a non-essential portion which is not sufficient to make a presentation of the service, or a duplicate of the service.

Advantageous Effects

As the quality of service (QoS) of each service or service component is controlled by processing data according to service characteristics, the present invention may provide various broadcast services.

The present invention may achieve transmission flexibility by providing various broadcast services in the same radio frequency (RF) signal bandwidth.

In spite of use of a mobile receiver or an indoor environment, the present invention may provide a method and apparatus for transmitting and receiving a broadcast signal, which can receive a digital broadcast signal without an error.

The present invention may effectively support a next-generation broadcast service in an environment supporting next-generation hybrid broadcasting that uses a terrestrial broadcasting network and the Internet.

The additional effects of the present invention will be described below in conjunction with the configuration of the present invention.

BRIEF DESCRIPTION OF THE DRAWINGS

FIG. 3 is a diagram showing a low level signaling (LLS) table and a service list table (SLT) according to one embodiment of the present invention.

FIG. 4 is a diagram showing a USBD and an S-TSID delivered through ROUTE according to one embodiment of the present invention.

FIG. 5 is a diagram showing a USBD delivered through MMT according to one embodiment of the present invention.

FIG. 6 is a diagram showing link layer operation according to one embodiment of the present invention.

FIG. 7 is a diagram showing a link mapping table (LMT) according to one embodiment of the present invention.

FIG. 9 is a diagram illustrating SLT information according to an embodiment of the present invention.

BEST MODE FOR CARRYING OUT THE INVENTION

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

Although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The present invention provides apparatuses and methods for transmitting and receiving broadcast signals for future broadcast services. Future broadcast services according to an embodiment of the present invention include a terrestrial broadcast service, a mobile broadcast service, an ultra high definition television (UHDTV) service, etc. The present invention may process broadcast signals for the future broadcast services through non-MIMO (Multiple Input Multiple Output) or MIMO according to one embodiment. A non-MIMO scheme according to an embodiment of the present invention may include a MISO (Multiple Input Single Output) scheme, a SISO (Single Input Single Output) scheme, etc. The present invention proposes a physical profile (or system) optimized to minimize receiver complexity while achieving performance required for special uses.

Figure 1:
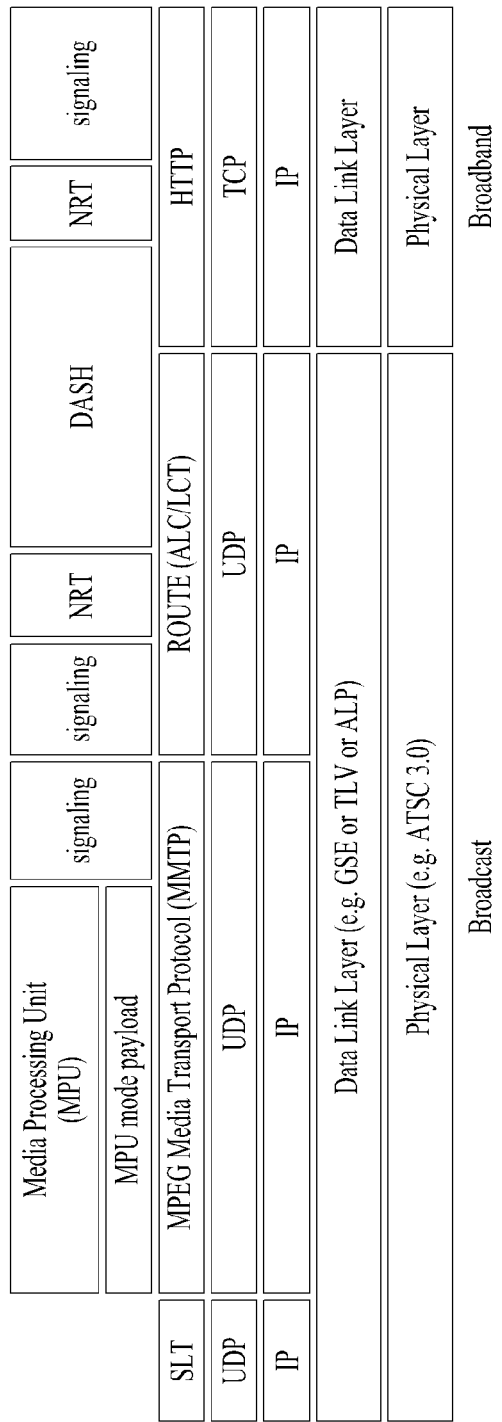
FIG. 1 illustrates a protocol stack according to an embodiment of the present invention.

FIG. 1 is a diagram showing a protocol stack according to an embodiment of the present invention.

A service may be delivered to a receiver through a plurality of layers. First, a transmission side may generate service data. The service data may be processed for transmission at a delivery layer of the transmission side and the service data may be encoded into a broadcast signal and transmitted over a broadcast or broadband network at a physical layer.

Here, the service data may be generated in an ISO base media file format (BMFF). ISO BMFF media files may be used for broadcast/broadband network delivery, media encapsulation and/or synchronization format. Here, the service data is all data related to the service and may include service components configuring a linear service, signaling information thereof, non-real time (NRT) data and other files.

The delivery layer will be described. The delivery layer may provide a function for transmitting service data. The service data may be delivered over a broadcast and/or broadband network.

Broadcast service delivery may include two methods.

As a first method, service data may be processed in media processing units (MPUs) based on MPEG media transport (MMT) and transmitted using an MMT protocol (MMTP). In this case, the service data delivered using the MMTP may include service components for a linear service and/or service signaling information thereof.

As a second method, service data may be processed into DASH segments and transmitted using real time object delivery over unidirectional transport (ROUTE), based on MPEG DASH. In this case, the service data delivered through the ROUTE protocol may include service components for a linear service, service signaling information thereof and/or NRT data. That is, the NRT data and non-timed data such as files may be delivered through ROUTE.

Data processed according to MMTP or ROUTE protocol may be processed into IP packets through a UDP/IP layer. In service data delivery over the broadcast network, a service list table (SLT) may also be delivered over the broadcast network through a UDP/IP layer. The SLT may be delivered in a low level signaling (LLS) table. The SLT and LLS table will be described later.

IP packets may be processed into link layer packets in a link layer. The link layer may encapsulate various formats of data delivered from a higher layer into link layer packets and then deliver the packets to a physical layer. The link layer will be described later.

In hybrid service delivery, at least one service element may be delivered through a broadband path. In hybrid service delivery, data delivered over broadband may include service components of a DASH format, service signaling information thereof and/or NRT data. This data may be processed through HTTP/TCP/IP and delivered to a physical layer for broadband transmission through a link layer for broadband transmission.

The physical layer may process the data received from the delivery layer (higher layer and/or link layer) and transmit the data over the broadcast or broadband network. A detailed description of the physical layer will be given later.

The service will be described. The service may be a collection of service components displayed to a user, the components may be of various media types, the service may be continuous or intermittent, the service may be real time or non-real time, and a real-time service may include a sequence of TV programs.

The service may have various types. First, the service may be a linear audio/video or audio service having app based enhancement. Second, the service may be an app based service, reproduction/configuration of which is controlled by a downloaded application. Third, the service may be an ESG service for providing an electronic service guide (ESG). Fourth, the service may be an emergency alert (EA) service for providing emergency alert information.

When a linear service without app based enhancement is delivered over the broadcast network, the service component may be delivered by (1) one or more ROUTE sessions or (2) one or more MMTP sessions.

When a linear service having app based enhancement is delivered over the broadcast network, the service component may be delivered by (1) one or more ROUTE sessions or (2) zero or more MMTP sessions. In this case, data used for app based enhancement may be delivered through a ROUTE session in the form of NRT data or other files. In one embodiment of the present invention, simultaneous delivery of linear service components (streaming media components) of one service using two protocols may not be allowed.

When an app based service is delivered over the broadcast network, the service component may be delivered by one or more ROUTE sessions. In this case, the service data used for the app based service may be delivered through the ROUTE session in the form of NRT data or other files.

Some service components of such a service, some NRT data, files, etc. may be delivered through broadband (hybrid service delivery).

That is, in one embodiment of the present invention, linear service components of one service may be delivered through the MMT protocol. In another embodiment of the present invention, the linear service components of one service may be delivered through the ROUTE protocol. In another embodiment of the present invention, the linear service components of one service and NRT data (NRT service components) may be delivered through the ROUTE protocol. In another embodiment of the present invention, the linear service components of one service may be delivered through the MMT protocol and the NRT data (NRT service components) may be delivered through the ROUTE protocol. In the above-described embodiments, some service components of the service or some NRT data may be delivered through broadband. Here, the app based service and data regarding app based enhancement may be delivered over the broadcast network according to ROUTE or through broadband in the form of NRT data. NRT data may be referred to as locally cached data.

Each ROUTE session includes one or more LCT sessions for wholly or partially delivering content components configuring the service. In streaming service delivery, the LCT session may deliver individual components of a user service, such as audio, video or closed caption stream. The streaming media is formatted into a DASH segment.

Each MMTP session includes one or more MMTP packet flows for delivering all or some of content components or an MMT signaling message. The MMTP packet flow may deliver a component formatted into MPU or an MMT signaling message.

For delivery of an NRT user service or system metadata, the LCT session delivers a file based content item. Such content files may include consecutive (timed) or discrete (non-timed) media components of the NRT service or metadata such as service signaling or ESG fragments. System metadata such as service signaling or ESG fragments may be delivered through the signaling message mode of the MMTP.

A receiver may detect a broadcast signal while a tuner tunes to frequencies. The receiver may extract and send an SLT to a processing module. The SLT parser may parse the SLT and acquire and store data in a channel map. The receiver may acquire and deliver bootstrap information of the SLT to a ROUTE or MMT client. The receiver may acquire and store an SLS. USBD may be acquired and parsed by a signaling parser.

Figure 2:
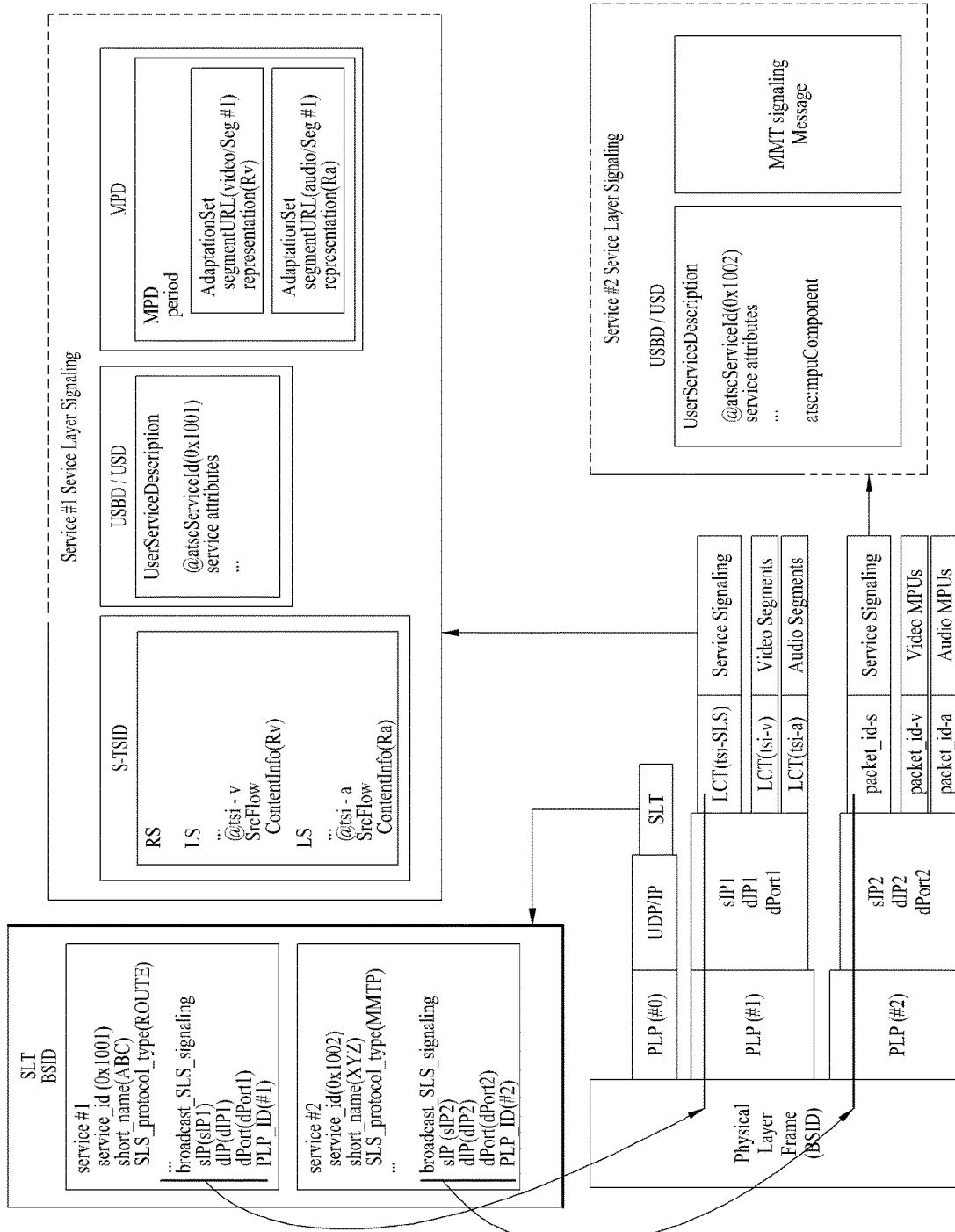
FIG. 2 is a diagram showing a service discovery procedure according to one embodiment of the present invention.

FIG. 2 is a diagram showing a service discovery procedure according to one embodiment of the present invention.

A broadcast stream delivered by a broadcast signal frame of a physical layer may carry low level signaling (LLS). LLS data may be carried through payload of IP packets delivered to a well-known IP address/port. This LLS may include an SLT according to type thereof. The LLS data may be formatted in the form of an LLS table. A first byte of every UDP/IP packet carrying the LLS data may be the start of the LLS table. Unlike the shown embodiment, an IP stream for delivering the LLS data may be delivered to a PLP along with other service data.

The SLT may enable the receiver to generate a service list through fast channel scan and provides access information for locating the SLS. The SLT includes bootstrap information. This bootstrap information may enable the receiver to acquire service layer signaling (SLS) of each service. When the SLS, that is, service signaling information, is delivered through ROUTE, the bootstrap information may include an LCT channel carrying the SLS, a destination IP address of a ROUTE session including the LCT channel and destination port information. When the SLS is delivered through the MMT, the bootstrap information may include a destination IP address of an MMTP session carrying the SLS and destination port information.

In the shown embodiment, the SLS of service #1 described in the SLT is delivered through ROUTE and the SLT may include bootstrap information sIP1, dIP1 and dPort1 of the ROUTE session including the LCT channel delivered by the SLS. The SLS of service #2 described in the SLT is delivered through MMT and the SLT may include bootstrap information sIP2, dIP2 and dPort2 of the MMTP session including the MMTP packet flow delivered by the SLS.

The SLS is signaling information describing the properties of the service and may include receiver capability information for significantly reproducing the service or providing information for acquiring the service and the service component of the service. When each service has separate service signaling, the receiver acquires appropriate SLS for a desired service without parsing all SLSs delivered within a broadcast stream.

When the SLS is delivered through the ROUTE protocol, the SLS may be delivered through a dedicated LCT channel of a ROUTE session indicated by the SLT. In some embodiments, this LCT channel may be an LCT channel identified by tsi=0. In this case, the SLS may include a user service bundle description (USBD)/user service description (USD), service-based transport session instance description (S-TSID) and/or media presentation description (MPD).

Here, USBD/USD is one of SLS fragments and may serve as a signaling hub describing detailed description information of a service. The USBD may include service identification information, device capability information, etc. The USBD may include reference information (URI reference) of other SLS fragments (S-TSID, MPD, etc.). That is, the USBD/USD may reference the S-TSID and the MPD. In addition, the USBD may further include metadata information for enabling the receiver to decide a transmission mode (broadcast/broadband network). A detailed description of the USBD/USD will be given below.

The S-TSID is one of SLS fragments and may provide overall session description information of a transport session carrying the service component of the service. The S-TSID may provide the ROUTE session through which the service component of the service is delivered and/or transport session description information for the LCT channel of the ROUTE session. The S-TSID may provide component acquisition information of service components associated with one service. The S-TSID may provide mapping between DASH representation of the MPD and the tsi of the service component. The component acquisition information of the S-TSID may be provided in the form of the identifier of the associated DASH representation and tsi and may or may not include a PLP ID in some embodiments. Through the component acquisition information, the receiver may collect audio/video components of one service and perform buffering and decoding of DASH media segments. The S-TSID may be referenced by the USBD as described above. A detailed description of the S-TSID will be given below.

The MPD is one of SLS fragments and may provide a description of DASH media presentation of the service. The MPD may provide a resource identifier of media segments and provide context information within the media presentation of the identified resources. The MPD may describe DASH representation (service component) delivered over the broadcast network and describe additional DASH presentation delivered over broadband (hybrid delivery). The MPD may be referenced by the USBD as described above.

When the SLS is delivered through the MMT protocol, the SLS may be delivered through a dedicated MMTP packet flow of the MMTP session indicated by the SLT. In some embodiments, the packet id of the MMTP packets delivering the SLS may have a value of 00. In this case, the SLS may include a USBD/USD and/or MMT packet (MP) table.

Here, the USBD is one of SLS fragments and may describe detailed description information of a service as in ROUTE. This USBD may include reference information (URI information) of other SLS fragments. The USBD of the MMT may reference an MP table of MMT signaling. In some embodiments, the USBD of the MMT may include reference information of the S-TSID and/or the MPD. Here, the S-TSID is for NRT data delivered through the ROUTE protocol. Even when a linear service component is delivered through the MMT protocol, NRT data may be delivered via the ROUTE protocol. The MPD is for a service component delivered over broadband in hybrid service delivery. The detailed description of the USBD of the MMT will be given below.

The MP table is a signaling message of the MMT for MPU components and may provide overall session description information of an MMTP session carrying the service component of the service. In addition, the MP table may include a description of an asset delivered through the MMTP session. The MP table is streaming signaling information for MPU components and may provide a list of assets corresponding to one service and location information (component acquisition information) of these components. The detailed description of the MP table may be defined in the MMT or modified. Here, the asset is a multimedia data entity, is combined by one unique ID, and may mean a data entity used to one multimedia presentation. The asset may correspond to service components configuring one service. A streaming service component (MPU) corresponding to a desired service may be accessed using the MP table. The MP table may be referenced by the USBD as described above.

The other MMT signaling messages may be defined. Additional information associated with the service and the MMTP session may be described by such MMT signaling messages.

The ROUTE session is identified by a source IP address, a destination IP address and a destination port number. The LCT session is identified by a unique transport session identifier (TSI) within the range of a parent ROUTE session. The MMTP session is identified by a destination IP address and a destination port number. The MMTP packet flow is identified by a unique packet id within the range of a parent MMTP session.

In case of ROUTE, the S-TSID, the USBD/USD, the MPD or the LCT session delivering the same may be referred to as a service signaling channel. In case of MMTP, the USBD/UD, the MMT signaling message or the packet flow delivering the same may be referred to as a service signaling channel.

Unlike the shown embodiment, one ROUTE or MMTP session may be delivered over a plurality of PLPs. That is, one service may be delivered through one or more PLPs. Unlike the shown embodiment, in some embodiments, components configuring one service may be delivered through different ROUTE sessions. In addition, in some embodiments, components configuring one service may be delivered through different MMTP sessions. In some embodiments, components configuring one service may be divided and delivered in a ROUTE session and an MMTP session. Although not shown, components configuring one service may be delivered through broadband (hybrid delivery).

FIG. 3 is a diagram showing a low level signaling (LLS) table and a service list table (SLT) according to one embodiment of the present invention.

One embodiment t3010 of the LLS table may include information according to an LLS_table_id field, a provider_id field, an LLS_table_version field and/or an LLS_table_id field.

The LLS_table_id field may identify the type of the LLS table, and the provider_id field may identify a service provider associated with services signaled by the LLS table. Here, the service provider is a broadcaster using all or some of the broadcast streams and the provider_id field may identify one of a plurality of broadcasters which is using the broadcast streams. The LLS_table_version field may provide the version information of the LLS table.

According to the value of the LLS_table_id field, the LLS table may include one of the above-described SLT, a rating region table (RRT) including information on a content advisory rating, SystemTime information for providing information associated with a system time, a common alert protocol (CAP) message for providing information associated with emergency alert. In some embodiments, the other information may be included in the LLS table.

One embodiment t3020 of the shown SLT may include an @bsid attribute, an @sltCapabilities attribute, an sltInetUrl element and/or a Service element. Each field may be omitted according to the value of the shown Use column or a plurality of fields may be present.

The @bsid attribute may be the identifier of a broadcast stream. The @sltCapabilities attribute may provide capability information required to decode and significantly reproduce all services described in the SLT. The sltInetUrl element may provide base URL information used to obtain service signaling information and ESG for the services of the SLT over broadband. The sltInetUrl element may further include an @urlType attribute, which may indicate the type of data capable of being obtained through the URL.

The Service element may include information on services described in the SLT, and the Service element of each service may be present. The Service element may include an @serviceId attribute, an @sltSvcSeqNum attribute, an @protected attribute, an @majorChannelNo attribute, an @minorChannelNo attribute, an @serviceCategory attribute, an @shortServiceName attribute, an @hidden attribute, an @broadbandAccessRequired attribute, an @svcCapabilities attribute, a BroadcastSvcSignaling element and/or an sycInetUrl element.

The @serviceId attribute is the identifier of the service and the @sltSvcSeqNum attribute may indicate the sequence number of the SLT information of the service. The @protected attribute may indicate whether at least one service component necessary for significant reproduction of the service is protected. The @majorChannelNo attribute and the @minorChannelNo attribute may indicate the major channel number and minor channel number of the service, respectively.

The @serviceCategory attribute may indicate the category of the service. The category of the service may include a linear A/V service, a linear audio service, an app based service, an ESG service, an EAS service, etc. The @shortServiceName attribute may provide the short name of the service. The @hidden attribute may indicate whether the service is for testing or proprietary use. The @broadbandAccessRequired attribute may indicate whether broadband access is necessary for significant reproduction of the service. The @svcCapabilities attribute may provide capability information necessary for decoding and significant reproduction of the service.

The BroadcastSvcSignaling element may provide information associated with broadcast signaling of the service. This element may provide information such as location, protocol and address with respect to signaling over the broadcast network of the service. Details thereof will be described below.

The sycInetUrl element may provide URL information for accessing the signaling information of the service over broadband. The sltInetUrl element may further include an @urlType attribute, which may indicate the type of data capable of being obtained through the URL.

The above-described BroadcastSvcSignaling element may include an @slsProtocol attribute, an @slsMajorProtocolVersion attribute, an @slsMinorProtocolVersion attribute, an @slsPlpId attribute, an @slsDestinationIpAddress attribute, an @slsDestinationUdpPort attribute and/or an @slsSourceIpAddress attribute.

The @slsProtocol attribute may indicate the protocol used to deliver the SLS of the service (ROUTE, MMT, etc.). The @slsMajorProtocolVersion attribute and the @slsMinorProtocolVersion attribute may indicate the major version number and minor version number of the protocol used to deliver the SLS of the service, respectively.

The @slsPlpId attribute may provide a PLP identifier for identifying the PLP delivering the SLS of the service. In some embodiments, this field may be omitted and the PLP information delivered by the SLS may be checked using a combination of the information of the below-described LMT and the bootstrap information of the SLT.

The @slsDestinationIpAddress attribute, the @slsDestinationUdpPort attribute and the @slsSourceIpAddress attribute may indicate the destination IP address, destination UDP port and source IP address of the transport packets delivering the SLS of the service, respectively. These may identify the transport session (ROUTE session or MMTP session) delivered by the SLS. These may be included in the bootstrap information.

FIG. 4 is a diagram showing a USBD and an S-TSID delivered through ROUTE according to one embodiment of the present invention.

One embodiment t4010 of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, an @serviceStatus attribute, an @fullMPDUri attribute, an @sTSIDUri attribute, a name element, a serviceLanguage element, a capabilityCode element and/or a deliveryMethod element. Each field may be omitted according to the value of the shown Use column or a plurality of fields may be present.

The @globalServiceID attribute is the globally unique identifier of the service and may be used for link with ESG data (Service@globalServiceID). The @serviceId attribute is a reference corresponding to the service entry of the SLT and may be equal to the service ID information of the SLT. The @serviceStatus attribute may indicate the status of the service. This field may indicate whether the service is active or inactive.

The @fullMPDUri attribute may reference the MPD fragment of the service. The MPD may provide a reproduction description of a service component delivered over the broadcast or broadband network as described above. The @sTSIDUri attribute may reference the S-TSID fragment of the service. The S-TSID may provide parameters associated with access to the transport session carrying the service as described above.

The name element may provide the name of the service. This element may further include an @lang attribute and this field may indicate the language of the name provided by the name element. The serviceLanguage element may indicate available languages of the service. That is, this element may arrange the languages capable of being provided by the service.

The capabilityCode element may indicate capability or capability group information of a receiver necessary to significantly reproduce the service. This information is compatible with capability information format provided in service announcement.

The deliveryMethod element may provide transmission related information with respect to content accessed over the broadcast or broadband network of the service. The deliveryMethod element may include a broadcastAppService element and/or a unicastAppService element. Each of these elements may have a basePattern element as a sub element.

The broadcastAppService element may include transmission associated information of the DASH representation delivered over the broadcast network. The DASH representation may include media components over all periods of the service presentation.

The basePattern element of this element may indicate a character pattern used for the receiver to perform matching with the segment URL. This may be used for a DASH client to request the segments of the representation. Matching may imply delivery of the media segment over the broadcast network.

The unicastAppService element may include transmission related information of the DASH representation delivered over broadband. The DASH representation may include media components over all periods of the service media presentation.

The basePattern element of this element may indicate a character pattern used for the receiver to perform matching with the segment URL. This may be used for a DASH client to request the segments of the representation. Matching may imply delivery of the media segment over broadband.

One embodiment t4020 of the shown S-TSID may have an S-TSID root element. The S-TSID root element may include an @serviceId attribute and/or an RS element. Each field may be omitted according to the value of the shown Use column or a plurality of fields may be present.

The @serviceId attribute is the identifier of the service and may reference the service of the USBD/USD. The RS element may describe information on ROUTE sessions through which the service components of the service are delivered. According to the number of ROUTE sessions, a plurality of elements may be present. The RS element may further include an @bsid attribute, an @sIpAddr attribute, an @dIpAddr attribute, an @dport attribute, an @PLPID attribute and/or an LS element.

The @bsid attribute may be the identifier of a broadcast stream in which the service components of the service are delivered. If this field is omitted, a default broadcast stream may be a broadcast stream including the PLP delivering the SLS of the service. The value of this field may be equal to that of the @bsid attribute.

The @sIpAddr attribute, the @dIpAddr attribute and the @dport attribute may indicate the source IP address, destination IP address and destination UDP port of the ROUTE session, respectively. When these fields are omitted, the default values may be the source address, destination IP address and destination UDP port values of the current ROUTE session delivering the SLS, that is, the S-TSID. This field may not be omitted in another ROUTE session delivering the service components of the service, not in the current ROUTE session.

The @PLPID attribute may indicate the PLP ID information of the ROUTE session. If this field is omitted, the default value may be the PLP ID value of the current PLP delivered by the S-TSID. In some embodiments, this field is omitted and the PLP ID information of the ROUTE session may be checked using a combination of the information of the below-described LMT and the IP address/UDP port information of the RS element.

The LS element may describe information on LCT channels through which the service components of the service are transmitted. According to the number of LCT channel, a plurality of elements may be present. The LS element may include an @tsi attribute, an @PLPID attribute, an @bw attribute, an @startTime attribute, an @endTime attribute, a SrcFlow element and/or a RepairFlow element.

The @tsi attribute may indicate the tsi information of the LCT channel. Using this, the LCT channels through which the service components of the service are delivered may be identified. The @PLPID attribute may indicate the PLP ID information of the LCT channel. In some embodiments, this field may be omitted. The @bw attribute may indicate the maximum bandwidth of the LCT channel. The @startTime attribute may indicate the start time of the LCT session and the @endTime attribute may indicate the end time of the LCT channel.

The SrcFlow element may describe the source flow of ROUTE. The source protocol of ROUTE is used to transmit a delivery object and at least one source flow may be established within one ROUTE session. The source flow may deliver associated objects as an object flow.

The RepairFlow element may describe the repair flow of ROUTE. Delivery objects delivered according to the source protocol may be protected according to forward error correction (FEC) and the repair protocol may define an FEC framework enabling FEC protection.

FIG. 5 is a diagram showing a USBD delivered through MMT according to one embodiment of the present invention.

One embodiment of the shown USBD may have a bundleDescription root element. The bundleDescription root element may have a userServiceDescription element. The userServiceDescription element may be an instance of one service.

The userServiceDescription element may include an @globalServiceID attribute, an @serviceId attribute, a Name element, a serviceLanguage element, a contentAdvisoryRating element, a Channel element, a mpuComponent element, a routeComponent element, a broadbandComponent element and/or a ComponentInfo element. Each field may be omitted according to the value of the shown Use column or a plurality of fields may be present.

The @globalServiceID attribute, the @serviceId attribute, the Name element and/or the serviceLanguage element may be equal to the fields of the USBD delivered through ROUTE. The contentAdvisoryRating element may indicate the content advisory rating of the service. This information is compatible with content advisory rating information format provided in service announcement. The Channel element may include information associated with the service. A detailed description of this element will be given below.

The mpuComponent element may provide a description of service components delivered as the MPU of the service. This element may further include an @mmtPackageId attribute and/or an @nextMmtPackageId attribute. The @mmtPackageId attribute may reference the MMT package of the service components delivered as the MPU of the service. The @nextMmtPackageId attribute may reference an MMT package to be used after the MMT package referenced by the @mmtPackageId attribute in terms of time. Through the information of this element, the MP table may be referenced.

The routeComponent element may include a description of the service components of the service. Even when linear service components are delivered through the MMT protocol, NRT data may be delivered according to the ROUTE protocol as described above. This element may describe information on such NRT data. A detailed description of this element will be given below.

The broadbandComponent element may include the description of the service components of the service delivered over broadband. In hybrid service delivery, some service components of one service or other files may be delivered over broadband. This element may describe information on such data. This element may further an @fullMPDUri attribute. This attribute may reference the MPD describing the service component delivered over broadband. In addition to hybrid service delivery, the broadcast signal may be weakened due to traveling in a tunnel and thus this element may be necessary to support handoff between broadband and broadband. When the broadcast signal is weak, the service component is acquired over broadband and, when the broadcast signal becomes strong, the service component is acquired over the broadcast network to secure service continuity.

The ComponentInfo element may include information on the service components of the service. According to the number of service components of the service, a plurality of elements may be present. This element may describe the type, role, name, identifier or protection of each service component. Detailed information of this element will be described below.

The above-described Channel element may further include an @serviceGenre attribute, an @serviceIcon attribute and/or a ServiceDescription element. The @serviceGenre attribute may indicate the genre of the service and the @serviceIcon attribute may include the URL information of the representative icon of the service. The ServiceDescription element may provide the service description of the service and this element may further include an @serviceDescrText attribute and/or an @serviceDescrLang attribute. These attributes may indicate the text of the service description and the language used in the text.

The above-described routeComponent element may further include an @sTSIDUri attribute, an @sTSIDDestinationIpAddress attribute, an @sTSIDDestinationUdpPort attribute, an @sTSIDSourceIpAddress attribute, an @sTSIDMajorProtocolVersion attribute and/or an @sTSIDMinorProtocolVersion attribute.

The @sTSIDUri attribute may reference an S-TSID fragment. This field may be equal to the field of the USBD delivered through ROUTE. This S-TSID may provide access related information of the service components delivered through ROUTE. This S-TSID may be present for NRT data delivered according to the ROUTE protocol in a state of delivering linear service component according to the MMT protocol.

The @sTSIDDestinationIpAddress attribute, the @sTSIDDestinationUdpPort attribute and the @sTSIDSourceIpAddress attribute may indicate the destination IP address, destination UDP port and source IP address of the transport packets carrying the above-described S-TSID. That is, these fields may identify the transport session (MMTP session or the ROUTE session) carrying the above-described S-TSID.

The @sTSIDMajorProtocolVersion attribute and the @sTSIDMinorProtocolVersion attribute may indicate the major version number and minor version number of the transport protocol used to deliver the above-described S-TSID, respectively.

The above-described ComponentInfo element may further include an @componentType attribute, an @componentRole attribute, an @componentProtectedFlag attribute, an @componentId attribute and/or an @componentName attribute.

The @componentType attribute may indicate the type of the component. For example, this attribute may indicate whether the component is an audio, video or closed caption component. The @componentRole attribute may indicate the role of the component. For example, this attribute may indicate main audio, music, commentary, etc. if the component is an audio component. This attribute may indicate primary video if the component is a video component. This attribute may indicate a normal caption or an easy reader type if the component is a closed caption component.

The @componentProtectedFlag attribute may indicate whether the service component is protected, for example, encrypted. The @componentId attribute may indicate the identifier of the service component. The value of this attribute may be the asset id (asset ID) of the MP table corresponding to this service component. The @componentName attribute may indicate the name of the service component.

FIG. 6 is a diagram showing link layer operation according to one embodiment of the present invention.

The link layer may be a layer between a physical layer and a network layer. A transmission side may transmit data from the network layer to the physical layer and a reception side may transmit data from the physical layer to the network layer (t6010). The purpose of the link layer is to compress (abstract) all input packet types into one format for processing by the physical layer and to secure flexibility and expandability of an input packet type which is not defined yet. In addition, the link layer may provide option for compressing (abstracting) unnecessary information of the header of input packets to efficiently transmit input data. Operation such as overhead reduction, encapsulation, etc. of the link layer is referred to as a link layer protocol and packets generated using this protocol may be referred to as link layer packets. The link layer may perform functions such as packet encapsulation, overhead reduction and/or signaling transmission.

At the transmission side, the link layer (ALP) may perform an overhead reduction procedure with respect to input packets and then encapsulate the input packets into link layer packets. In addition, in some embodiments, the link layer may perform encapsulation into the link layer packets without performing the overhead reduction procedure. Due to use of the link layer protocol, data transmission overhead on the physical layer may be significantly reduced and the link layer protocol according to the present invention may provide IP overhead reduction and/or MPEG-2 TS overhead reduction.

When the shown IP packets are input as input packets (t6010), the link layer may sequentially perform IP header compression, adaptation and/or encapsulation. In some embodiments, some processes may be omitted. For example, the RoHC module may perform IP packet header compression to reduce unnecessary overhead. Context information may be extracted through the adaptation procedure and transmitted out of band. The IP header compression and adaption procedure may be collectively referred to as IP header compression. Thereafter, the IP packets may be encapsulated into link layer packets through the encapsulation procedure.

When MPEG 2 TS packets are input as input packets, the link layer may sequentially perform overhead reduction and/or an encapsulation procedure with respect to the TS packets. In some embodiments, some procedures may be omitted. In overhead reduction, the link layer may provide sync byte removal, null packet deletion and/or common header removal (compression). Through sync byte removal, overhead reduction of 1 byte may be provided per TS packet. Null packet deletion may be performed in a manner in which reinsertion is possible at the reception side. In addition, deletion (compression) may be performed in a manner in which common information between consecutive headers may be restored at the reception side. Some of the overhead reduction procedures may be omitted. Thereafter, through the encapsulation procedure, the TS packets may be encapsulated into link layer packets. The link layer packet structure for encapsulation of the TS packets may be different from that of the other types of packets.

First, IP header compression will be described.

The IP packets may have a fixed header format but some information necessary for a communication environment may be unnecessary for a broadcast environment. The link layer protocol may compress the header of the IP packet to provide a mechanism for reducing broadcast overhead.

IP header compression may employ a header compressor/decompressor and/or an adaptation module. The IP header compressor (RoHC compressor) may reduce the size of each IP packet header based on the RoHC scheme. Thereafter, the adaptation module may extract context information and generate signaling information from each packet stream. A receiver may parse signaling information associated with the packet stream and attach context information to the packet stream. The RoHC decompressor may restore the packet header to reconfigure an original IP packet. Hereinafter, IP header compression may mean only IP header compression by a header compression or a combination of IP header compression and an adaptation process by an adaptation module. The same is true in decompressing.

Hereinafter, adaptation will be described.

In transmission of a single-direction link, when the receiver does not have context information, the decompressor cannot restore the received packet header until complete context is received. This may lead to channel change delay and turn-on delay. Accordingly, through the adaptation function, configuration parameters and context information between the compressor and the decompressor may be transmitted out of band. The adaptation function may provide construction of link layer signaling using context information and/or configuration parameters. The adaptation function may use previous configuration parameters and/or context information to periodically transmit link layer signaling through each physical frame.

Context information is extracted from the compressed IP packets and various methods may be used according to adaptation mode.

Mode #1 refers to a mode in which no operation is performed with respect to the compressed packet stream and an adaptation module operates as a buffer.

Mode #2 refers to a mode in which an IR packet is detected from a compressed packet stream to extract context information (static chain). After extraction, the IR packet is converted into an IR-DYN packet and the IR-DYN packet may be transmitted in the same order within the packet stream in place of an original IR packet.

Mode #3 (t6020) refers to a mode in which IR and IR-DYN packets are detected from a compressed packet stream to extract context information. A static chain and a dynamic chain may be extracted from the IR packet and a dynamic chain may be extracted from the IR-DYN packet. After extraction, the IR and IR-DYN packets are converted into normal compression packets. The converted packets may be transmitted in the same order within the packet stream in place of original IR and IR-DYN packets.

In each mode, the context information is extracted and the remaining packets may be encapsulated and transmitted according to the link layer packet structure for the compressed IP packets. The context information may be encapsulated and transmitted according to the link layer packet structure for signaling information, as link layer signaling.

The extracted context information may be included in a RoHC-U description table (RDT) and may be transmitted separately from the RoHC packet flow. Context information may be transmitted through a specific physical data path along with other signaling information. The specific physical data path may mean one of normal PLPs, a PLP in which low level signaling (LLS) is delivered, a dedicated PLP or an L1 signaling path. Here, the RDT may be context information (static chain and/or dynamic chain) and/or signaling information including information associated with header compression. In some embodiments, the RDT shall be transmitted whenever the context information is changed. In addition, in some embodiments, the RDT shall be transmitted every physical frame. In order to transmit the RDT every physical frame, the previous RDT may be reused.

The receiver may select a first PLP and first acquire signaling information of the SLT, the RDT, the LMT, etc., prior to acquisition of a packet stream. When signaling information is acquired, the receiver may combine the signaling information to acquire mapping between service IP information context information PLP. That is, the receiver may check which service is transmitted in which IP streams or which IP streams are delivered in which PLP and acquire context information of the PLPs. The receiver may select and decode a PLP carrying a specific packet stream. The adaptation module may parse context information and combine the context information with the compressed packets. To this end, the packet stream may be restored and delivered to the RoHC decompressor. Thereafter, decompression may start. At this time, the receiver may detect IR packets to start decompression from an initially received IR packet (mode 1), detect IR-DYN packets to start decompression from an initially received IR-DYN packet (mode 2) or start decompression from any compressed packet (mode 3).

Hereinafter, packet encapsulation will be described.

The link layer protocol may encapsulate all types of input packets such as IP packets, TS packets, etc. into link layer packets. To this end, the physical layer processes only one packet format independently of the protocol type of the network layer (here, an MPEG-2 TS packet is considered as a network layer packet). Each network layer packet or input packet is modified into the payload of a generic link layer packet.

In the packet encapsulation procedure, segmentation may be used. If the network layer packet is too large to be processed in the physical layer, the network layer packet may be segmented into two or more segments. The link layer packet header may include fields for segmentation of the transmission side and recombination of the reception side. Each segment may be encapsulated into the link layer packet in the same order as the original location.

In the packet encapsulation procedure, concatenation may also be used. If the network layer packet is sufficiently small such that the payload of the link layer packet includes several network layer packets, concatenation may be performed. The link layer packet header may include fields for performing concatenation. In concatenation, the input packets may be encapsulated into the payload of the link layer packet in the same order as the original input order.

The link layer packet may include a header and a payload. The header may include a base header, an additional header and/or an optional header. The additional header may be further added according to situation such as concatenation or segmentation and the additional header may include fields suitable for situations. In addition, for delivery of the additional information, the optional header may be further included. Each header structure may be pre-defined. As described above, if the input packets are TS packets, a link layer header having packets different from the other packets may be used.

Hereinafter, link layer signaling will be described.

Link layer signaling may operate at a level lower than that of the IP layer. The reception side may acquire link layer signaling faster than IP level signaling of the LLS, the SLT, the SLS, etc. Accordingly, link layer signaling may be acquired before session establishment.

Link layer signaling may include internal link layer signaling and external link layer signaling. Internal link layer signaling may be signaling information generated at the link layer. This includes the above-described RDT or the below-described LMT. External link layer signaling may be signaling information received from an external module, an external protocol or a higher layer. The link layer may encapsulate link layer signaling into a link layer packet and deliver the link layer packet. A link layer packet structure (header structure) for link layer signaling may be defined and link layer signaling information may be encapsulated according to this structure.

FIG. 7 is a diagram showing a link mapping table (LMT) according to one embodiment of the present invention.

The LMT may provide a list of higher layer sessions carried through the PLP. In addition, the LMT may provide additional information for processing link layer packets carrying the higher layer sessions. Here, the higher layer session may also be referred to as multicast. Information on IP streams or transport sessions transmitted through a specific PLP may be acquired through the LMT. In contrast, information on through which PLP a specific transport session is delivered may be acquired.

The LMT may be delivered in any PLP identified as carrying LLS. Here, the PLP in which the LLS is delivered may be identified by an LLS flag of L1 detail signaling information of a physical layer. The LLS flag may be a flag field indicating whether the LLS is delivered in the PLP, each PLP. Here, L1 detail signaling information may correspond to the below-described PLS2 data.

That is, the LMT may be delivered in the same PLP along with the LLS. Each LMT shall describe mapping between PLPs and IP addresses/ports as described above. As described above, the LLS may include an SLT and the IP address/port described in the LMT may be any IP address/port associated with any service described in the SLT delivered in the same PLP as the LMT.

In some embodiments, the PLP identifier information in the above-described SLT, SLS, etc. may be used to confirm information indicating through which PLP a specific transport session indicated by the SLT or SLS is transmitted may be confirmed.

In another embodiment, the PLP identifier information in the above-described SLT, SLS, etc. will be omitted and PLP information of the specific transport session indicated by the SLT or SLS may be confirmed by referring to the information in the LMT. In this case, the receiver may combine the LMT and other IP level signaling information to identify the PLP. Even in this embodiment, the PLP information in the SLT, SLS, etc. is not omitted and may remain in the SLT, SLS, etc.

The LMT according to the shown embodiment may include a signaling type field, a PLP_ID field, a num_session field and/or information on each session. Although the LMT of the shown embodiment describes IP streams transmitted through one PLP, a PLP loop may be added to the LMT to describe information on a plurality of PLPs in some embodiments. In this case, the LMT may describe, in a PLP loop, PLPs for any IP address/port associated with any service described in the SLT delivered together, as described above.

The signaling_type field may indicate the type of signaling information delivered by the table. The value of signaling_type field for the LMT may be set to 0x01. The signaling_type field may be omitted. The PLP_ID field may identify a target PLP to be described. If the PLP loop is used, each PLP_ID field may identify each target PLP. The PLP_ID field and subsequent fields thereof may be included in the PLP loop. The below-described PLP_ID field is an identifier for one PLP of the PLP loop and the below-described fields may be fields for the corresponding PLP.

The num_session field may indicate the number of higher layer sessions delivered through the PLP identified by the corresponding PLP_ID field. According to the number indicated by the num_session field, information on each session may be included. This information may include a src_IP_add field, a dst_IP_add field, a src_UDP_port field, a dst_UDP_port field, a SID_flag_field, a compressed_flag field, an SID field and/or a context_id field.

The src_IP_add field, the dst_IP_add field, the src_UDP_port field and the dst_UDP_port field may indicate the source IP address, the destination IP address, the source UDP port and the destination UDP port of the transport session among the higher layer sessions delivered through the PLP identified by the corresponding PLP_ID field.

The SID_flag field may indicate whether the link layer packet delivering the transport session has an SID field in the optional header. The link layer packet delivering the higher layer session may have an SID field in the optional header and the SID field value may be equal to that of the SID field in the LMT.

The compressed_flag field may indicate whether header compression is applied to the data of the link layer packet delivering the transport session. In addition, presence/absence of the below-described context_id field may be determined according to the value of this field. If header compression is applied (compressed_flag=1), the RDT may be present and the PLP_ID field of the RDT may have the same value as the PLP_ID field associated with this compressed_flag field.

The SID field may indicate the SIDs (sub stream IDs) of the link layer packets delivering the transport session. These link layer packets may include SIDs having the same values as this SID field in the optional header thereof. To this end, the receiver may filter link layer packets using LMT information and the SID information of the link layer packet header, without parsing all link layer packets.

The context_id field may provide a reference for a context id (CID) in the RDT. The CID information of the RDT may indicate the context ID of the compression IP packet stream. The RDT may provide context information of the compression IP packet stream. Through this field, the RDT and the LMT may be associated.

In the above-described embodiments of the signaling information/table of the present invention, the fields, elements or attributes may be omitted or may be replaced with other fields. In some embodiments, additional fields, elements or attributes may be added.

In one embodiment of the present invention, service components of one service may be delivered through a plurality of ROUTE sessions. In this case, an SLS may be acquired through bootstrap information of an SLT. An S-TSID and an MPD may be referenced through the USBD of the SLS. The S-TSID may describe not only the ROUTE session delivered by the SLS but also transport session description information of another ROUTE session carried by the service components. To this end, the service components delivered through the plurality of ROUTE sessions may all be collected. This is similarly applicable to the case in which the service components of one service are delivered through a plurality of MMTP sessions. For reference, one service component may be simultaneously used by the plurality of services.

In another embodiment of the present invention, bootstrapping of an ESG service may be performed by a broadcast or broadband network. By acquiring the ESG over broadband, URL information of the SLT may be used. ESG information may be requested using this URL.

In another embodiment of the present invention, one service component of one service may be delivered over the broadcast network and the other service component may be delivered over broadband (hybrid). The S-TSID may describe components delivered over the broadcast network such that the ROUTE client acquires desired service components. In addition, the USBD may have base pattern information to describe which segments (which components) are delivered through which path. Accordingly, the receiver can confirm a segment to be requested from the broadband service and a segment to be detected in a broadcast stream.

In another embodiment of the present invention, scalable coding of a service may be performed. The USBD may have all capability information necessary to render the service. For example, when one service is provided in HD or UHD, the capability information of the USBD may have a value of "HD or UHD". The receiver may check which component is reproduced in order to render the UHD or HD service using the MPD.

In another embodiment of the present invention, through a TOI field of the LCT packets delivered through the LCT channel delivering the SLS, which SLS fragment is delivered using the LCT packets (USBD, S-TSID, MPD, etc.) may be identified.

In another embodiment of the present invention, app components to be used for app based enhancement/an app based service may be delivered over the broadcast network as NRT components or may be delivered over broadband. In addition, app signaling for app based enhancement may be performed by an application signaling table (AST) delivered along with the SLS. In addition, an event which is signaling for operation to be performed by the app may be delivered in the form of an event message table (EMT) along with the SLS, may be signaled in the MPD or may be in-band signaled in the form of a box within DASH representation. The AST, the EMT, etc. may be delivered over broadband. App based enhancement, etc. may be provided using the collected app components and such signaling information.

In another embodiment of the present invention, a CAP message may be included and provided in the above-described LLS table for emergency alert. Rich media content for emergency alert may also be provided. Rich media may be signaled by a CAP message and, if rich media is present, the rich media may be provided as an EAS service signaled by the SLT.

In another embodiment of the present invention, linear service components may be delivered over the broadcast network according to the MMT protocol. In this case, NRT data (e.g., app components) of the service may be delivered over the broadcast network according to the ROUTE protocol. In addition, the data of the service may be delivered over broadband. The receiver may access the MMTP session delivering the SLS using the bootstrap information of the SLT. The USBD of the SLS according to the MMT may reference the MP table such that the receiver acquires linear service components formatted into the MPU delivered according to the MMT protocol. In addition, the USBD may further reference the S-TSID such that the receiver acquires NRT data delivered according to the ROUTE protocol. In addition, the USBD may further reference the MPD to provide a reproduction description of data delivered over broadband.

In another embodiment of the present invention, the receiver may deliver location URL information capable of acquiring a file content item (file, etc.) and/or a streaming component to a companion device through a web socket method. The application of the companion device may acquire components, data, etc. through a request through HTTP GET using this URL. In addition, the receiver may deliver information such as system time information, emergency alert information, etc. to the companion device.

Figure 8:
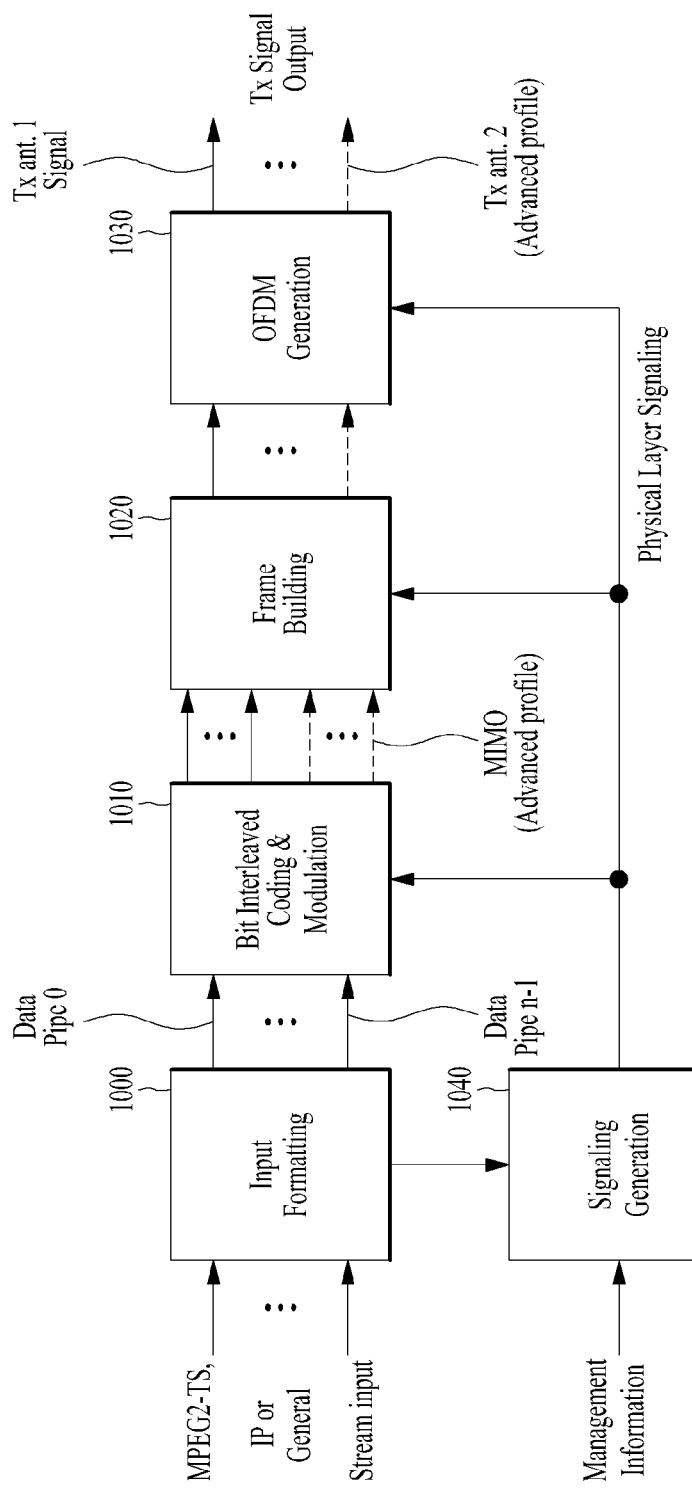
FIG. 8 is a diagram illustrating a structure of a broadcast signal transmission apparatus of a next-generation broadcast service according to an embodiment of the present invention.

FIG. 8 is a diagram illustrating a structure of a broadcast signal transmission apparatus of a next-generation broadcast service according to an embodiment of the present invention.

The broadcast signal transmission apparatus of a next-generation broadcast service according to an embodiment of the present invention may include an input format block 1000, a bit interleaved coding & modulation (BICM) block 1010, a frame building block 1020, an orthogonal frequency division multiplexing (OFDM) generation block 1030, and a signaling generation block 1040. Each block of the broadcast signal transmission apparatus will be described below.

Input data according to an embodiment of the present invention may have main input format of IP stream/packet and MPEG2-TS and another stream type may be treated as general stream.

The input format block 1000 may demultiplex each input stream to one or plural data pipes to which independent coding and modulation are applied. The data pipe may be a basic unit for control of robustness and may affect quality of service (QoS). One or plural services or service components may be delivered by one data pipe. The data pipe may be a logical channel in a physical layer for service data or related metadata for transmitting one or plural services or service components.

QoS is dependent upon the characteristics of a service provided by a broadcast signal transmission apparatus of a next-generation broadcast service according to an embodiment of the present invention and, thus, data corresponding to each service needs to be processed through different methods.

The BICM block 1010 may include a processing block applied to a profile (or system) to which MIMO is not applied and/or a processing block of a profile (or system) to which MIMO is applied and may include a plurality of processing blocks for processing each data pipe.

The processing block of the BICM block to which MIMO is not applied may include a data FEC encoder, a bit interleaver, a constellation mapper, a signal space diversity (SSD) encoding block, and a time interleaver. The processing block of the BICM block to which MIMO is applied may be different from the processing block of the BICM to which MIMO is not applied in that the processing block of the BICM block to which MIMO is applied further include a cell word demultiplexer and a MIMO encoding block.

The data FEC encoder may perform FEC encoding on an input BBF to generate a FECBLOCK procedure by using external coding (BCH) and external coding (LDPC). The external coding (BCH) may be a selective coding method. The bit interleaver may interleave output of the data FEC encoder to achieve optimized capability via a combination of LDPC code and modulation methods. The constellation mapper may modulate cell word from the bit interleaver or the cell word demultiplexer by using QPSK, QAM-16, irregular QAM (NUQ-64, NUQ-256, and NUQ-1024), or irregular constellation (NUC-16, NUC-64, NUC-256, and NUC-1024) to provide a normalized constellation point. The NUQ has a random shape but QAM-16 and NUQ have a square shape. Both the NUQ and the NUC may be specially defined with respect to a code rate and may be signaled by parameter DP MOD of PLS2 data. The time interleaver may be operated at a data pipe level. The parameter of the time interleaving may be differently set with respect to respective data pipes.

The time interleaver according to the present invention may be positioned between a BICM chain block and a frame builder. In this case, the time interleaver according to the present invention may selectively use or may use all of a convolution interleaver (CI) and a block interleaver (BI) according to a physical layer pipe (PLP) mode. The PLP according to an embodiment of the present invention may be a physical path used as the same concept as the aforementioned DP and the term may be changed according to designer intention. The PLP mode according to an embodiment of the present invention may include a single PLP mode or a multiple PLP mode according to a broadcast signal transmission apparatus and the number of PLPs processed by the broadcast signal transmission apparatus. According to the present invention, time interleaving to which different time interleaving methods are applied according to a PLP mode may be referred to as hybrid time interleaving.

The hybrid time interleaving may include a block interleaver (BI) and a convolution interleaver (CI). In the case of PLP NUM=1, the BI may not be applied (block interleaver off) and only the CI may be applied. In the case of PLP NUM>1, both the BI and the CI may be applied (block interleaver on). A structure and operation of the applied CI in the case of PLP NUM>1 may be different from those of the applied CI in the case of PLP NUM=1. The hybrid time deinterleaver may perform an operation corresponding to a reverse operation of the aforementioned hybrid time interleaver.

The cell word demultiplexer may be used to divide a single cell word stream into a dual cell word stream to perform MIMO processing. The MIMO encoding block may process output of the cell word demultiplexer by using a MIMO encoding method. The MIMO encoding method according to the present invention may be defined as full-rate spatial multiplexing (FR-SM) for providing capacity increase due to comparative little increase in complexity at a receiver. The MIMO processing may be applied at a data pipe level. When NUQ ($e1,i$ and $e2,i$) as a pair of constellation outputs is supplied as input of the MIMO encoder, an MIMO encoder output pair ($g1,i$ and $g2,i$) may be transmitted by the same carrier k and OFDM symbol 1 of each Tx antenna.

The frame building block 1020 may map a data cell of an input data pipe to an OFDM symbol in one frame and perform frequency interleaving for frequency domain diversity.

A frame according to an embodiment of the present invention may be divided into a preamble, one or more frame signaling symbol (FSS), and a normal data symbol. The preamble may be a special symbol for providing a set of basic transfer parameters for effective transmission and reception of a signal. The preamble may signal a basic transfer parameter and a transmission type of a frame. In particular, the preamble may indicate whether an emergency alert service (EAS) is provided in a current frame. The main object of the FSS is to transmit PLS data. For fast synchronization and channel estimation and fast decoding of PLS data, the FSS may have a pilot pattern of higher density than the normal data symbol.

The frame building block may include a delay compensation block for adjusting timing between a data pipe and corresponding PLS data to ensure co-time between the data pipe and the corresponding PLS data at a transmitter, a cell mapper for mapping PLS, a data pipe, an auxiliary stream, a dummy cell, and so on to an active carrier of an OFDM symbol in a frame, and a frequency interleaver.

The frequency interleaver may randomly interleave a data cell received by the cell mapper to provide frequency diversity. The frequency interleaver may operate with respect to data corresponding to an OFDM symbol pair including two sequential OFDM symbols and data corresponding to one OFDM symbol by using different interleaving seed order to acquire maximum interleaving gain in a single frame.

The OFDM generation block 1030 may modulate an OFDM carrier by a cell generated by the frame building block, insert a pilot, and generate a time domain signal for transmission. In addition, the corresponding block may sequentially inset a guard interval and may apply PAPR reduction processing to generate a last RF signal.

The signaling generation block 1040 may generate physical layer signaling information used in an operation of each functional block. Signaling information according to an embodiment of the present invention may include PLS data. The PLS may provide an element for access to a physical layer data pipe by a receiver. The PLS data may include PLS1 data and PLS2 data.

The PLS1 data may a first set of PLS data transmitted to the FSS in a frame with a fixed size, coding, and modulation for transmitting basic information on a system as well as a parameter required to decode the PLS2 data. The PLS1 data may provide basic transmission parameter including a parameter required to receive and decode the PLS2 data. The PLS2 data may be a second set of PLS data for transmitting detailed PLS data of a data pipe and a system and transmitted to the FSS. The PLS2 signaling may further include two types of parameters of PLS2 static data (PLS2-STAT data) and PLS2 dynamic data (PLS2-DYN data). The PLS2 static data may be PLS2 data that is static during duration of a frame group and the PLS2 dynamic frame may be PLS2 data that is dynamically changed every frame.

The PLS2 data may include FIC_FLAG information. A fast information channel (FIC) may be a dedicated channel for transmitting cross-layer information for enabling fast service acquisition and channel scanning. The FIC_FLAG information may be a 1-bit field and may indicate whether a fast information channel (FIC) is used in a current frame group. When a value of a corresponding field is set to 1, the FIC may be provided in the current frame. When a value of the corresponding field is set to 0, the FIC may not be transmitted in the current frame. The BICM block 1010 may include a BICM block for protection of PLS data. The BICM block for protection of PLS data may include a PLS FEC encoder, a bit interleaver, and a constellation mapper.

The PLS FEC encoder may include a scrambler for scrambling PLS1 data and PLS2 data, a BCH encoding/zero inserting block for performing external encoding on the scrambled PLS 1 and 2 data by using a shortened BCH code for PLS protection and inserting a zero bit after BCH encoding, an LDPC encoding block for encoding by using an LDPC code, and an LDPC parity puncturing block. An output bit of zero insertion may be permutated only on the PLS1 data prior to LDPC encoding. The bit interleaver may interleave the shortened and punctured PLS1 data and PLS2 data and the constellation mapper may map the bit-interleaved PLS1 data and PLS2 data to constellation.

The broadcast signal reception apparatus of a next-generation broadcast service according to an embodiment of the present invention may perform a reverse procedure of the broadcast signal transmission apparatus of a next-generation broadcast service described with reference to FIG. 8.

The broadcast signal reception apparatus of a next-generation broadcast service according to an embodiment of the present invention may include a synchronization & demodulation module for performing demodulation corresponding a reverse procedure of a procedure performed by the broadcast signal transmission apparatus, a frame parsing module for parsing an input signal frame and extracting data for transmitting a service selected by a user, a demapping & decoding module for converting an input signal into bit region data, deinterleaving the bit region data as necessary and, then, performing demapping on mapping applied for transmission efficiency, an output processor for performing a reverse procedure of various compression/signal processing procedures applied by the broadcast signal transmission apparatus, and a signaling decoding module for acquiring and processing PLS information from a signal demodulated by the synchronization & demodulation module. The frame parsing module, the demapping & decoding module, and the output processor may perform the function by using PLS data output from the signaling decoding module.

Hereinafter, the time interleaver will be described. A time interleaving group according to an embodiment of the present invention may be mapped directly to one frame or spread over PI frames. In addition, each time interleaving group may be divided into one or more (NTI) time interleaving blocks. Here, each time interleaving block may correspond to one time use of a time interleaver memory. The time interleaving block in the time interleaving group may include different numbers of XFECBLOCKs. In general, the time interleaver may also function as a buffer with respect to data pipe data prior to a frame generation procedure.

The time interleaver according to an embodiment of the present invention may be a twisted row-column block interleaver. The twisted row-column block interleaver according to an embodiment of the present invention may write a first XFECBLOCK in a first column of a time interleaving memory in a row direction, and write a second XFECBLOCK in a next column and write the remaining XFECBLOCKs in the time interleaving block in the same method. In addition, in an interleaving array, a cell may be read in a diagonal direction to a last row from a first row (in a right direction along a row from a leftmost column). In this case, to achieve single memory deinterleaving at a receiver irrespective of the number of XFECBLOCKs in the time interleaving block, the interleaving array for the twisted row-column block interleaver may insert a virtual XFECBLOCK into a time interleaving memory. In this case, to achieve single memory deinterleaving at a receiver, the virtual XFECBLOCK needs to be inserted into a front-most portion of another XFECBLOCK.

Now, a description will be given of a method of transmitting a service in multiple RF channels. That is, a method of transmitting a service in two or more RF channels and a method of configuring signaling information for the same will be described.

A broadcast service may have components delivered in one or more RF channels. A set of components of such a service within one RF channel may be referred to as a portion of the service. The broadcast service may include at least one portion. The broadcast service may include at least one portion which is sufficient for a meaningful presentation of the service without the use of the other portions. This portion may be referred to as an "essential portion". Each service portion may be included in an SLT of an RF channel in which the service portion appears. Multiple listings of service portions may have the same service ID and the same major/minor channel number. Therefore, when a receiver performs channel scan, the receiver may consolidate multiple portions of a service in multiple RF channels into a single service.

An SLT entry for each portion of the service may list the broadcast stream identifiers (BSIDs) of broadcast streams in which the other portions may be found. If the service includes at least one essential portion, the at least one essential portion may be indicated by an SLT. In the absence of an essential portion, the absence of an essential portion may also be indicated by the SLT. The receiver may determine whether to provide a component based on an MPD of the service. An S-TSID for each portion of the service may describe an LCT channel for each component within the portion.

FIG. 9 illustrates SLT information according to an embodiment of the present invention.

FIG. 9 depicts another embodiment of the SLT illustrated in FIG. 3, in which the SLT further includes signaling information for the afore-described multi-channel transmission. Therefore, elements and attributes included in the SLT, which have been described before with reference to FIG. 3 will not be described herein to avoid redundancy. The signaling information added to the SLT of FIG. 9 will be described below. All the added signaling information corresponds to subordinate information under the Service element.

@essential: An @essential attribute 9010 in the Service element indicates whether a portion delivered in this broadcast stream is essential. When a service includes portions delivered in multiple RF channels, the essential attribute may indicate whether a portion delivered in this broadcast stream is essential.

In an embodiment, when an OtherBsid element is not present for the service, the essential attribute may not be present either. When the @essential attribute is present and set to "true", this attribute indicates that the service identified by a @serviceID attribute includes components in multiple RF channels, and the portion delivered in this broadcast stream is essential to make a meaningful presentation of the service. When the @essential attribute is present and set to "false", this attribute indicates that the service identified by the service ID attribute (@serviceID) includes components in multiple RF channels, and the portion delivered in this broadcast stream is not essential to make a meaningful presentation of the service. There is no default value for this attribute.

OtherBsid: An OtherBsid element 9020 corresponds to identifier information that identifies another broadcast stream delivering a duplicate of this service or an additional portion or component of this service.

@type: A @type attribute 9030 indicates whether the broadcast stream identified by the OtherBsid element includes a duplicate or another portion of this service. When the value of @type is set to a value corresponding to "duplicate", this may indicate that the broadcast stream identified by the OtherBsid element delivers a duplicate of the service, and when the value of @type is set to a value corresponding to "portion", this may indicate that the broadcast stream identified by the OtherBsid element delivers another portion including an additional component of the service. If the value of @type is set to the value corresponding to "portion", this may also indicate that the Service element represents a portion of the service having components in multiple broadcast streams.

@essential: An @essential attribute 9040 in the OtherBsid element indicates whether the service portion delivered in the broadcast stream identified by the OtherBsid element is essential. In an embodiment, when the @type attribute indicates "portion", the @essential attribute may indicate whether the portion delivered in the broadcast stream identified by the OtherBsid element is essential to make a meaningful presentation of the service. If the @essential attribute is set to "true", it may indicate that the portion is essential, and if the @essential attribute is set to "false", it may indicate that the portion is not essential. In an embodiment, "false" may be set as the default value of the @essential attribute.

In an embodiment, all components required for a meaning presentation of a service may be delivered in a single RF channel, and supplemental components may be delivered in another RF channel. A capability code may be defined, which enables simultaneous rendering of content of multiple RF channels. The capability code may be parameterized to indicate the number of RF channels delivering components.

The afore-described signaling information will be described below in conjunction with a physical layer configuration. In the disclosure, a data pipe described before with reference to FIG. 8 may be referred to as a physical layer pipe (PLP). Thus, the following description is given in the context of PLPs.

Figure 10:
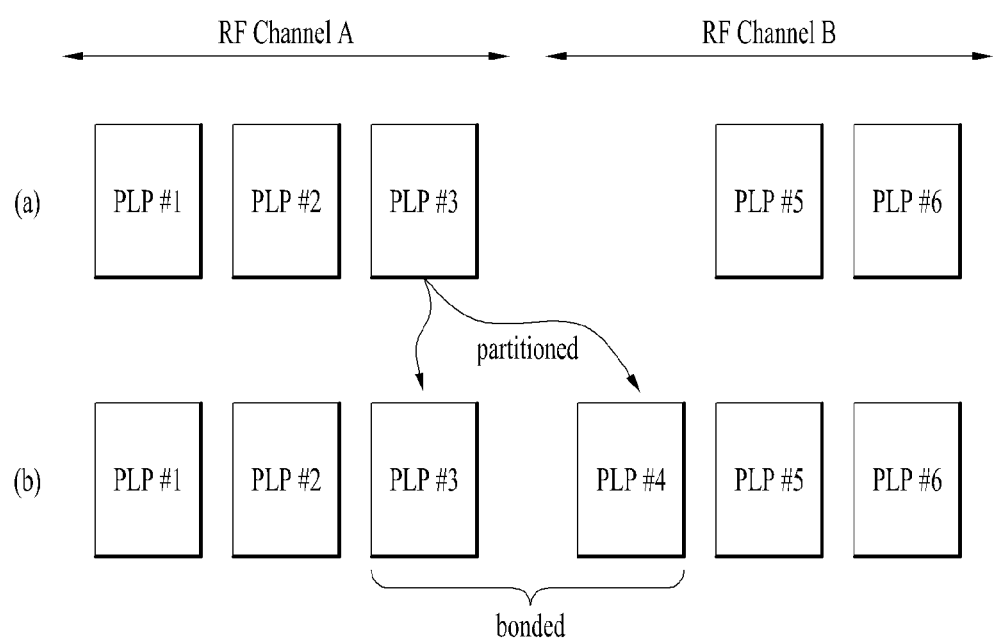
FIG. 10 is a diagram illustrating a physical layer configuration for channel bonding according to an embodiment of the present invention.

FIG. 10 illustrates a physical layer configuration for channel bonding according to an embodiment of the present invention.

As described before, components of a broadcast service may be delivered in a plurality of RF channels, and the plurality of RF channels may be bonded. In this case, at least one PLP may be partitioned into a plurality of channels, for transmission. To recover an ALP packet stream from bonded PLPs, a plurality of tuners may be required.

For channel bonding, at least one PLP may be transmitted in a plurality of RF channels. In an embodiment, there are two channel bonding types: plain channel bonding and SNR-averaged channel bonding. In the plain channel bonding, packets may be split from bonded PLPs. Although the SNR-averaged channel bonding is identical to the plain channel bonding, the former offers higher robustness than the latter.

FIG. 10(*a*) illustrates transmission of a service in one or more PLPs without channel bonding. PLP #1 to PLP #3 may be transmitted in RF channel A, and PLP #5 and PLP #6 may be transmitted in RF channel B.

FIG. 10(*b*) illustrates channel bonding. As illustrated in FIG. 10(*b*), data corresponding to PLP #3 may be split into RF channel A and RF channel B, and thus separately transmitted. Data of one PLP may be transmitted separately in PLP #3 of RF channel A and PLP #4 of RF channel B. Accordingly, the receiver may provide the service by combining the PLP data of the two channels.

Figure 11:
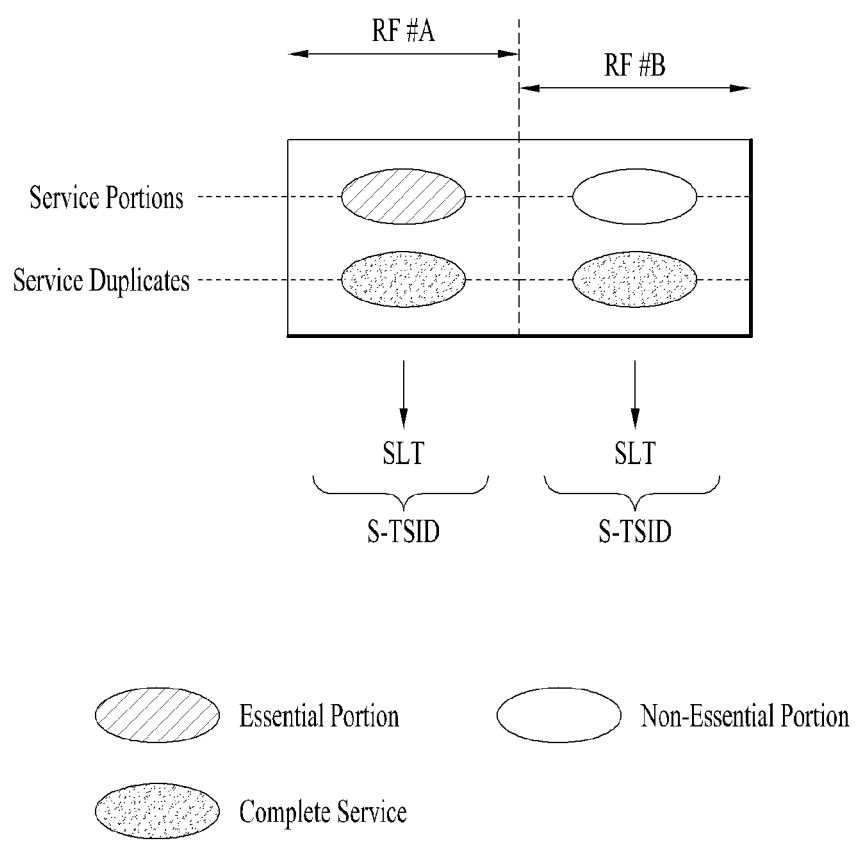
FIG. 11 is a diagram illustrating a multi-channel transmission method according to an embodiment of the present invention.

FIG. 11 illustrates a multi-channel transmission method according to an embodiment of the present invention.

FIG. 11 illustrates transmission of a service in multiple channels without channel bonding. As illustrated in FIG. 11, channel A (RF # A) may deliver an essential portion of a service and a service duplicate being a complete service. Channel B (RF # B) may deliver a non-essential portion and a service duplicate of the service. Because a service duplicate may provide a complete service, the service duplicate may correspond to an essential portion.

As illustrated in FIG. 11, in multi-channel transmission, an essential portion and a non-essential portion of a service may be transmitted separately in a plurality of channels, or an essential portion and a duplicate of a service may be transmitted separately in a plurality of channels.

A transmitted service component may be signaled by an SLT and an S-TSID.

Figure 12:
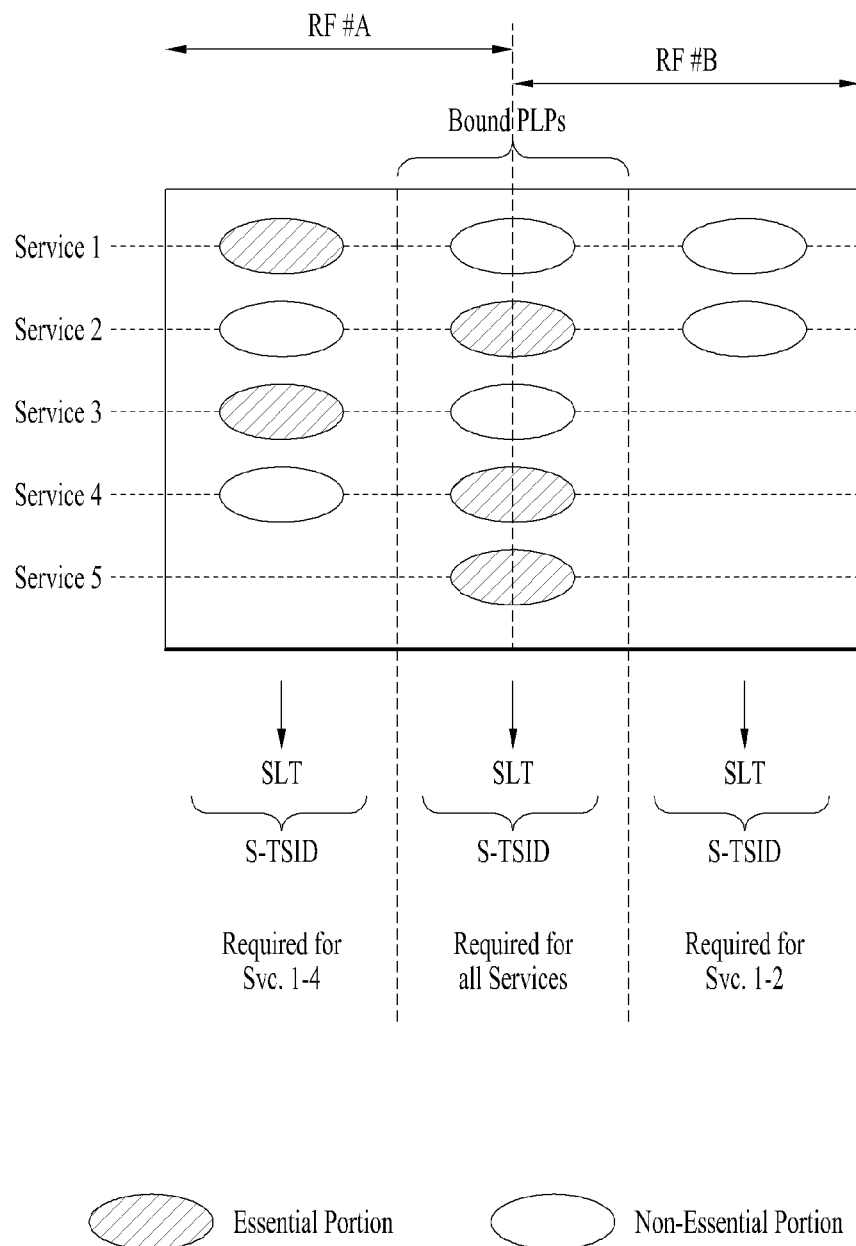
FIG. 12 is a diagram illustrating a channel bonding method according to an embodiment of the present invention.

FIG. 12 illustrates a channel bonding method according to an embodiment of the present invention.

FIG. 12 depicts a method of transmitting one service via two channels, RF # A and RF # B, in which a different channel bonding and transmission method is used for each service. A detailed description will be given below of each service.

In FIG. 12, it is assumed that each of services is transmitted in two channels. Dual-tuner receivers may not support channel bonding. If a specific RF channel is tuned for an SLT, and the SLT is acquired from the RF channel, all services listed in the SLT may be acquired with a single tuner tuned to the same RF channel. If an S-TSID of a service is acquired with a single tuner tuned to a specific RF channel, all components listed in the S-TSID may be acquired with a single tuner tuned to the same RF channel. A receiver may understand signaling even when channel scan is out-of-data except when the BSED of an unknown RF channel is referred to.

In FIG. 12, a circle may represent a service component or a PLP. A PLP transmitted in both of channel A and channel B may be bonded PLPs. The following signaling rules are given for FIG. 12 and a related embodiment.

(1) Non-Bonded/Un-Bonded Parts

1) If an essential portion is delivered only via a bonded part, an SLT and an S-TSID may not be delivered via a non-bonded part.

2) The SLT may list services in a non-bonded part of each RF channel.

3) OtherBSID information may indicate the other RF channels. A list-type may identify and reference bonded RF channels.

4) The S-TSID may list components within the non-bonded part of each RF channel.

(2) Bonded Parts

1) An SLT and an S-TSID may be delivered in a bonded part resulting from channel bonding.

2) The SLT may list services of the bonded part.

3) OtherBSID information may indicate an RF channel other than channels listed in the OtherBSID information of the SLT of the non-bonded part.

4) The S-TSID may list components within the bonded part. If the S-TSID is not delivered in the non-bonded part, the S-TSID may list components of the non-bonded part of an RF channel.

To signal multi-channel transmission and channel bonding, an SLT should include multiple BSIDs. Further, the SLT may include OtherBSID information for other RF channels including the same service. The OtherBSID information may have multiple values to indicate the channel-bonded RF channels.

Figure 13:
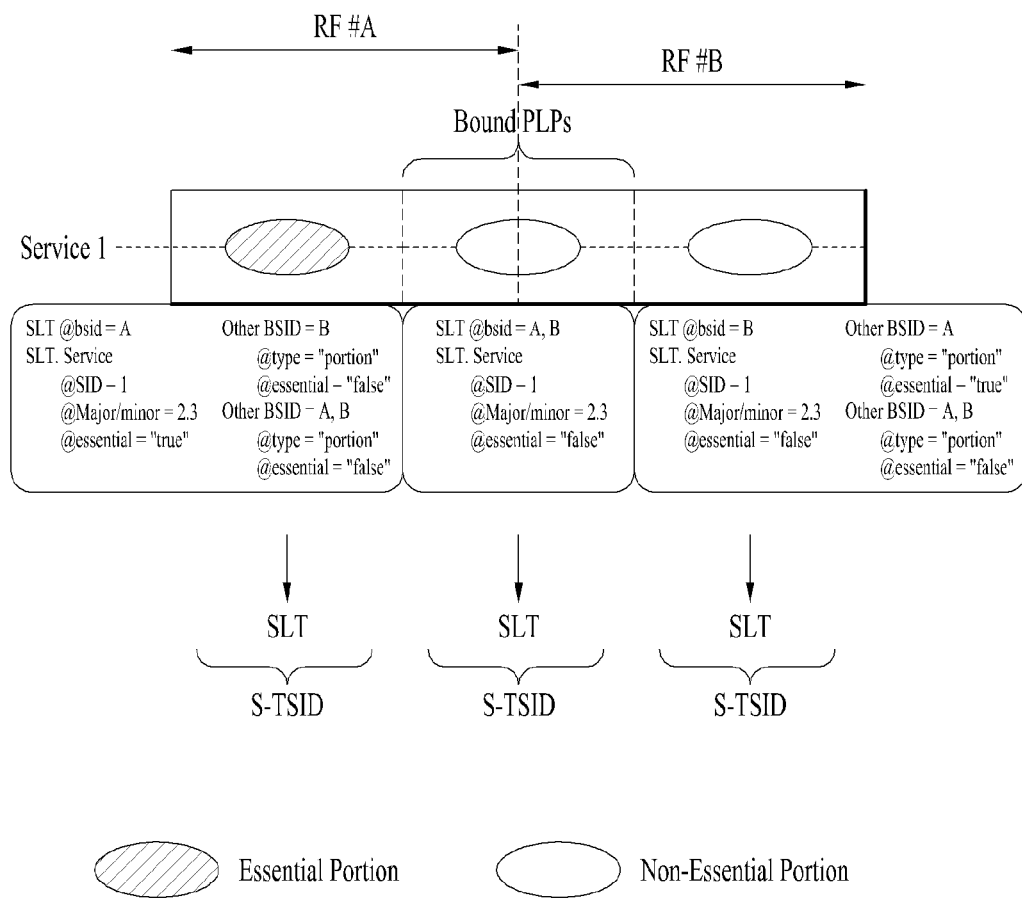
FIG. 13 is a diagram illustrating a channel bonding and multi-channel transmission method for service 1.

FIG. 13 illustrates a channel bonding and multi-channel transmission method for service 1.

For service 1, a non-bonded essential portion is transmitted in channel A, a bonded non-essential portion is transmitted in both of channel A and channel B, and a non-bonded non-essential portion is transmitted in channel B.

(1) SLT Signaling of Channel A

In an SLT of channel A, bsid information indicates channel A. In the SLT, service ID information indicates service 1, and a channel number indicates the channel number of the service. Essential information for service 1 of channel A is set to "true".

There are two pieces of OtherBSID information for channel A, one having a value of A, B indicating channels A and B, and the other having a value of B indicating channel B. The value of A, B indicates the bonded non-essential portion, and the value of B indicates the non-bonded non-essential portion. For each BSID, type information indicates that the service identified by the BSID is a portion, and essential information indicates that the service portion is essential.

(2) SLT Signaling of Channel B

In an SLT of channel B, bsid information indicates channel B. In the SLT, service ID information indicates service 1, and a channel number indicates the channel number of the service. Essential information for service 1 of channel A is set to "false".

There are two pieces of OtherBSID information for channel B, one having the value of A, B indicating channels A and B and the other having the value of A indicating channel A. The value of A, B indicates the bonded non-essential portion, and the value of A indicates the bonded essential portion. For each BSID, type information and essential information indicate whether a corresponding PLP/portion is essential/non-essential.

(3) SLT Signaling of Bonded PLPs

The bonded PLPs transmitted in channels A and B include an SLT. Since the SLT is basically channel-wise signaling, it is efficient in terms of signaling and reception processing to include a separate SLT for the bonded channels in the bonded PLPs.

A BSID for the bonded PLPs indicates channels A and B carrying the bonded PLPs. In the SLT, service ID information indicates service 1, and a channel number indicates the channel number of the service. Essential information for service 1 of channel A is set to "false".

Figure 14:
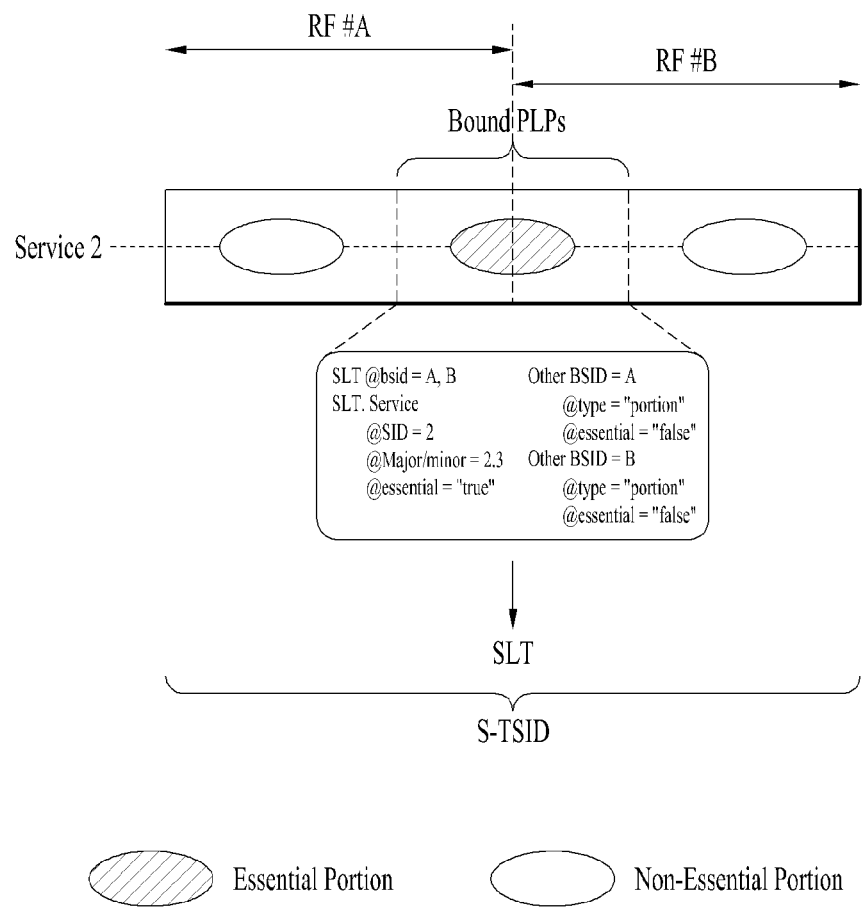
FIG. 14 is a diagram illustrating a channel bonding and multi-channel transmission method for service 2.

FIG. 14 illustrates a channel bonding and multi-channel transmission method for service 2.

For service 2, a bonded essential portion is transmitted in both of channels A and B, and a non-bonded non-essential portion is transmitted in each of channel A and channel B.

(1) SLT Signaling of Channel a or Channel B

In an embodiment, when an essential portion is delivered only in a bonded part, an SLT and an S-TSID may not be delivered in a non-bonded part.

(2) SLT Signaling of Bonded PLPs

The bonded PLPs transmitted in channels A and B include an SLT. Since the SLT is basically channel-wise signaling, it is efficient in terms of signaling and reception processing to include a separate SLT for the bonded channels in the bonded PLPs.

A BSID for the bonded PLPs indicates channels A and B carrying the bonded PLPs. In the SLT, service ID information indicates service 1, and a channel number indicates the channel number of the service.

For service 1 of channel A, type information indicates "portion", and essential information is set to "false". If a single-tuner receiver receives a bonded part and is tuned to channel B, the single-tuner receiver needs signaling information for OtherBSID=A.

For service 1 of channel B, type information indicates "portion", and essential information is set to "false". If a single-tuner receiver receives a bonded part and is tuned to channel A, the single-tuner receiver needs signaling information for OtherBSID=B.

Figure 15:
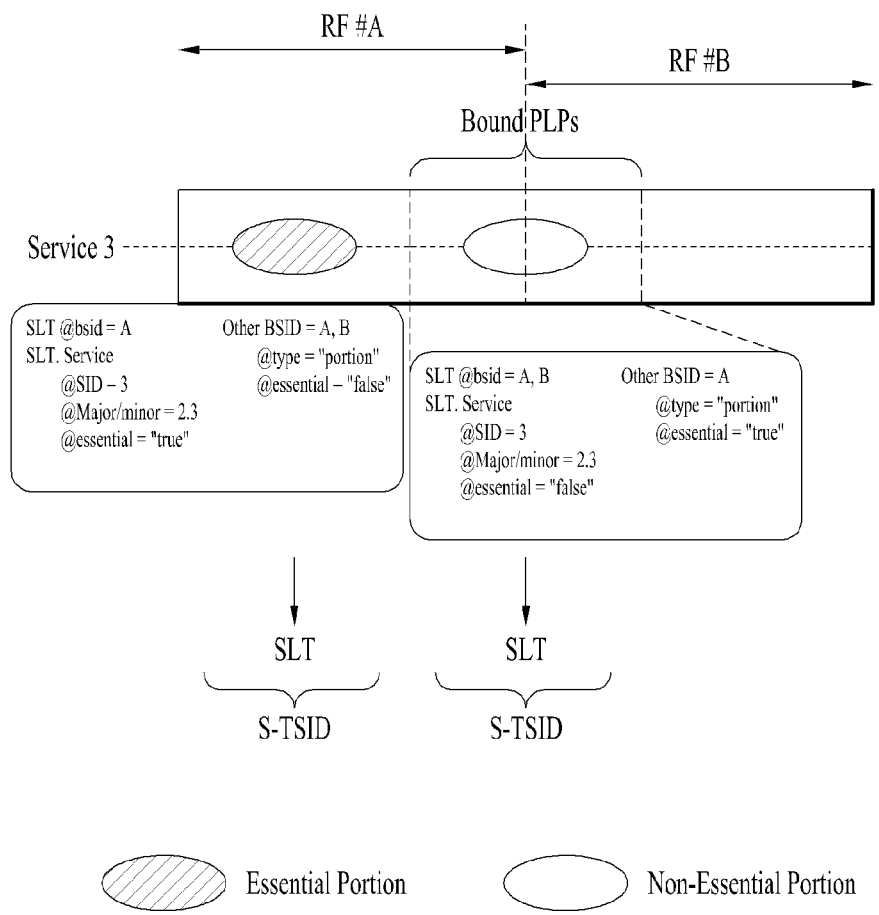
FIG. 15 is a diagram illustrating a channel bonding and multi-channel transmission method for service 3.

FIG. 15 illustrates a channel bonding and multi-channel transmission method for service 3.

For service 3, a non-bonded essential portion is transmitted in channel A, and a bonded non-essential portion is transmitted in both of channel A and channel B.

(1) SLT Signaling of Channel A

In an SLT of channel A, bsid information indicates channel A. In the SLT, service ID information indicates service 1, and a channel number indicates the channel number of the service. Essential information for service 1 of channel A is set to "true".

There is on piece of OtherBSID information for channel A, which has the value of A, B indicating channels A and B. The value of A, B indicates the bonded non-essential portion. For each BSID, type information indicates that the service identified by the BSID is a portion, and essential information indicates that the service portion is essential.

(2) SLT Signaling of Bonded PLPs

The bonded PLPs transmitted in channels A and B include an SLT. Since the SLT is basically channel-wise signaling, it is efficient in terms of signaling and reception processing to include a separate SLT for the bonded channels in the bonded PLPs.

A BSID in the SLT of the bonded PLPs indicates channels A and B. In the SLT, service ID information indicates service 1, and a channel number indicates the channel number of the service. Essential information for service 1 of channel A is set to "false".

The SLT of the bonded PLPs includes OtherBSID information indicating channel A. If a single-tuner receiver receives a bonded part and is tuned to channel B, the single-tuner receiver needs signaling information for OtherBSID=A.

Figure 16:
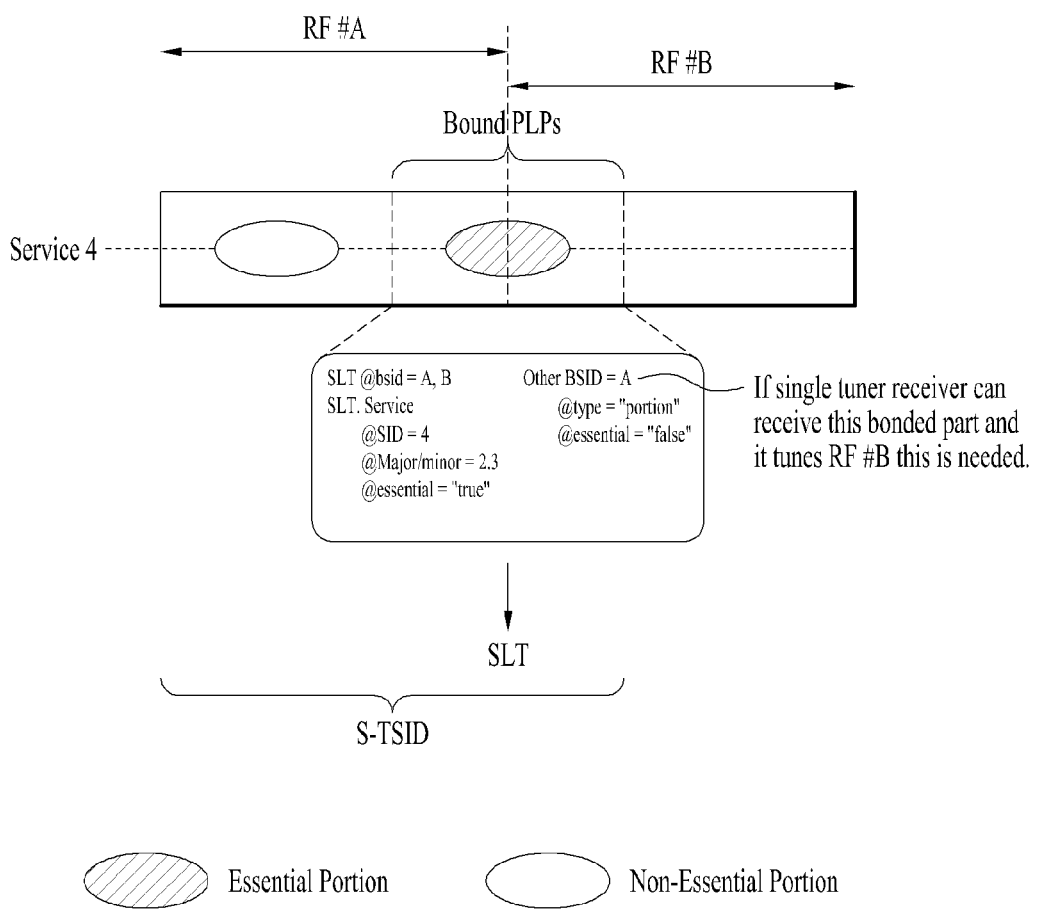
FIG. 16 is a diagram illustrating a channel bonding and multi-channel transmission method for service 4.

FIG. 16 illustrates a channel bonding and multi-channel transmission method for service 4.

For service 4, a bonded essential portion is transmitted in both of channels A and B, and a non-bonded non-essential portion is transmitted in channel A.

(1) SLT Signaling of Channel a or Channel B

In an embodiment, when an essential portion is delivered only in a bonded part, an SLT and an S-TSID may not be delivered in a non-bonded part.

(2) SLT Signaling of Bonded PLPs

The bonded PLPs transmitted in channels A and B include an SLT. Since the SLT is basically channel-wise signaling, it is efficient in terms of signaling and reception processing to include a separate SLT for the bonded channels in the bonded PLPs.

A BSID for the bonded PLPs indicates channels A and B carrying the bonded PLPs. Service ID information included in the SLT indicates service 4, and a channel number indicates the channel number of the service.

For service 4 of channel A, type information indicates "portion", and essential information is set to "false". If a single-tuner receiver receives a bonded part and is tuned to channel B, the single-tuner receiver needs signaling information for OtherBSID=A.

Figure 17:
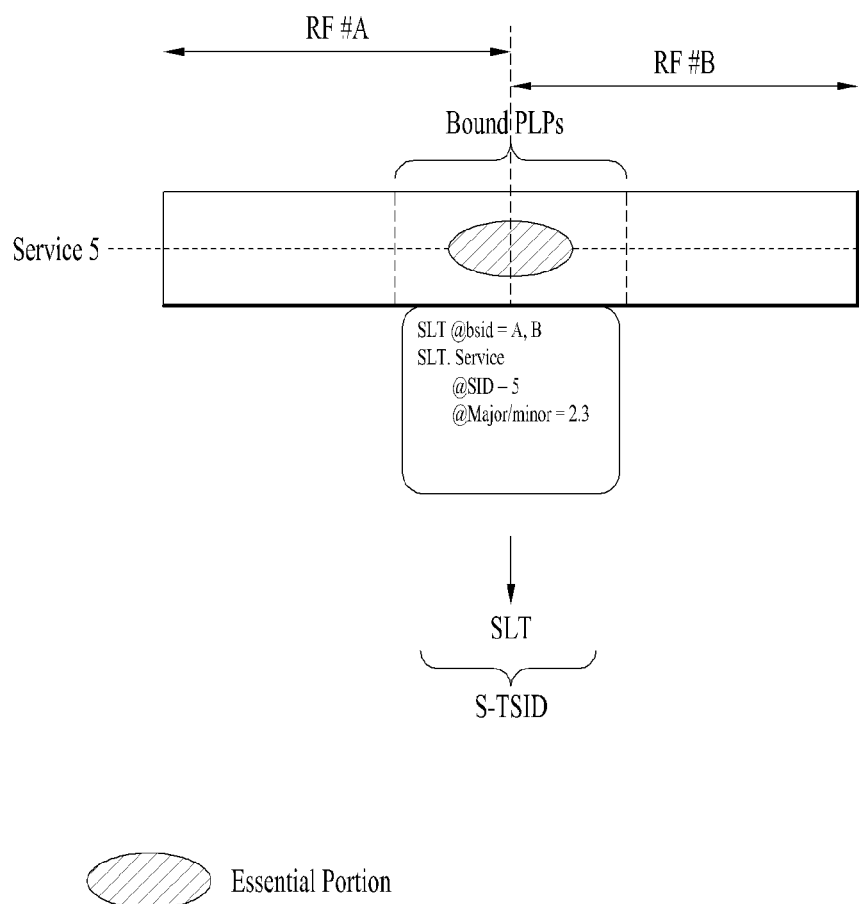
FIG. 17 is a diagram illustrating a channel bonding and multi-channel transmission method for service 5.

FIG. 17 illustrates a channel bonding and multi-channel transmission method for service 5.

For service 5, a bonded essential portion is transmitted in both of channels A and B.

(1) SLT Signaling of Channel a or Channel B

In an embodiment, when an essential portion is delivered only in a bonded part, an SLT and an S-TSID may not be delivered in a non-bonded part.

(2) SLT Signaling of Bonded PLPs

The bonded PLPs transmitted in channels A and B include an SLT. Since the SLT is basically channel-wise signaling, it is efficient in terms of signaling and reception processing to include a separate SLT for the bonded channels in the bonded PLPs.

A BSID for the bonded PLPs indicates channels A and B. In the SLT, service ID information indicates service 5, and a channel number indicates the channel number of the service. Because the essential portion is delivered in the bonded PLPs, the essential field is set to "true". In an embodiment, the essential attribute may be omitted.

Figure 18:
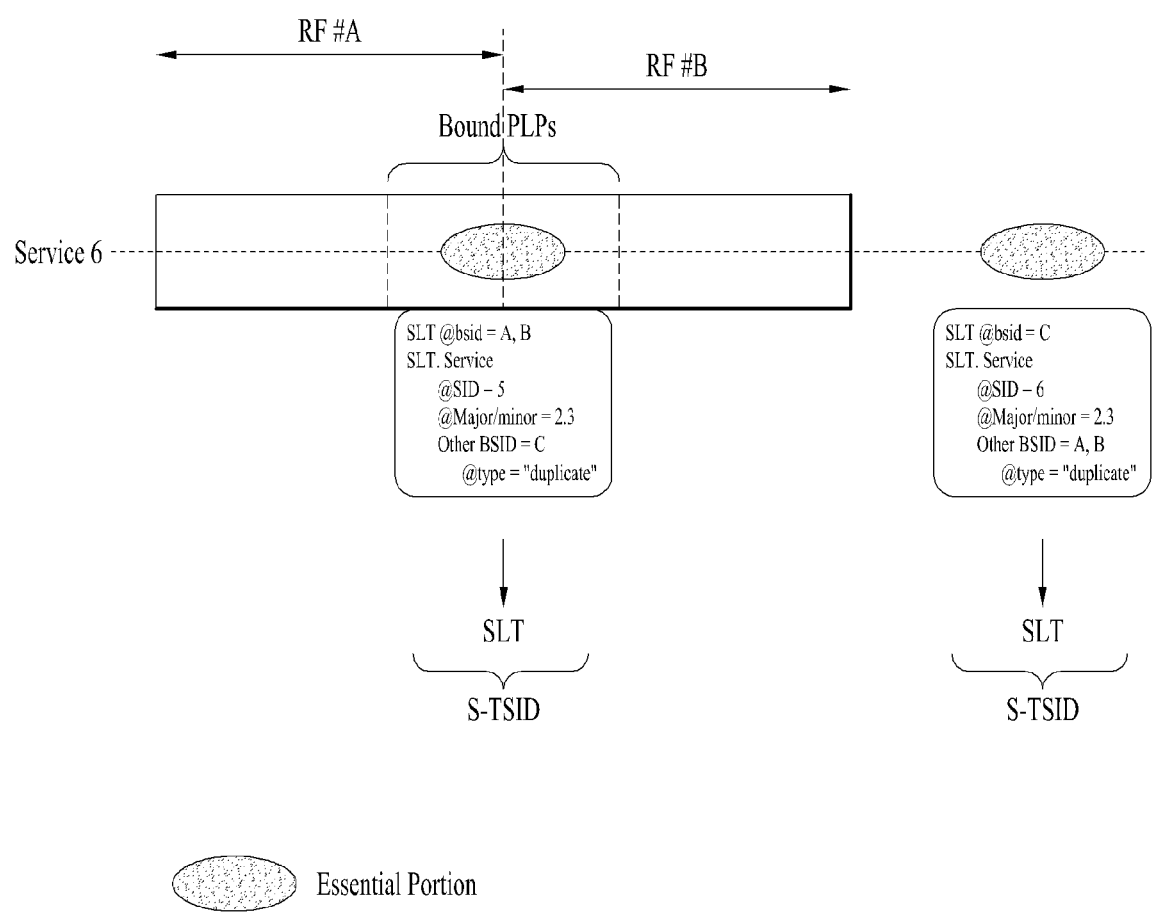
FIG. 18 is a diagram illustrating a channel bonding and multi-channel transmission method for service 6.

FIG. 18 illustrates a channel bonding and multi-channel transmission method for service 6.

Service 6 is a complete service, corresponding to a service duplicate.

(1) SLT Signaling of Channel a or Channel B

In an embodiment, when a complete service is delivered in bonded PLPs, an SLT and an S-TSID may not be delivered in a non-bonded part.

(2) SLT Signaling of Bonded PLPs

The bonded PLPs transmitted in channels A and B include an SLT. Since the SLT is basically channel-wise signaling, it is efficient in terms of signaling and reception processing to include a separate SLT for the bonded channels in the bonded PLPs.

A BSID for the bonded PLPs indicates channels A and B carrying the bonded PLPs. In the SLT, service ID information indicates service 6, and a channel number indicates the channel number of the service.

OtherBSID information indicates channel C delivering a service duplicate. Since service 6 is a service duplicate as a complete service, type information indicates "duplicate".

(3) SLT Signaling of Channel C

A BSID in an SLT transmitted in channel C indicates channel C. In the SLT, service ID information indicates service 6, and a channel number indicates the channel number of the service.

OtherBSID information indicates channels A and B delivering a service duplicate. Since service 6 is a service duplicate as a complete service, type information indicates "duplicate".

Figure 19:
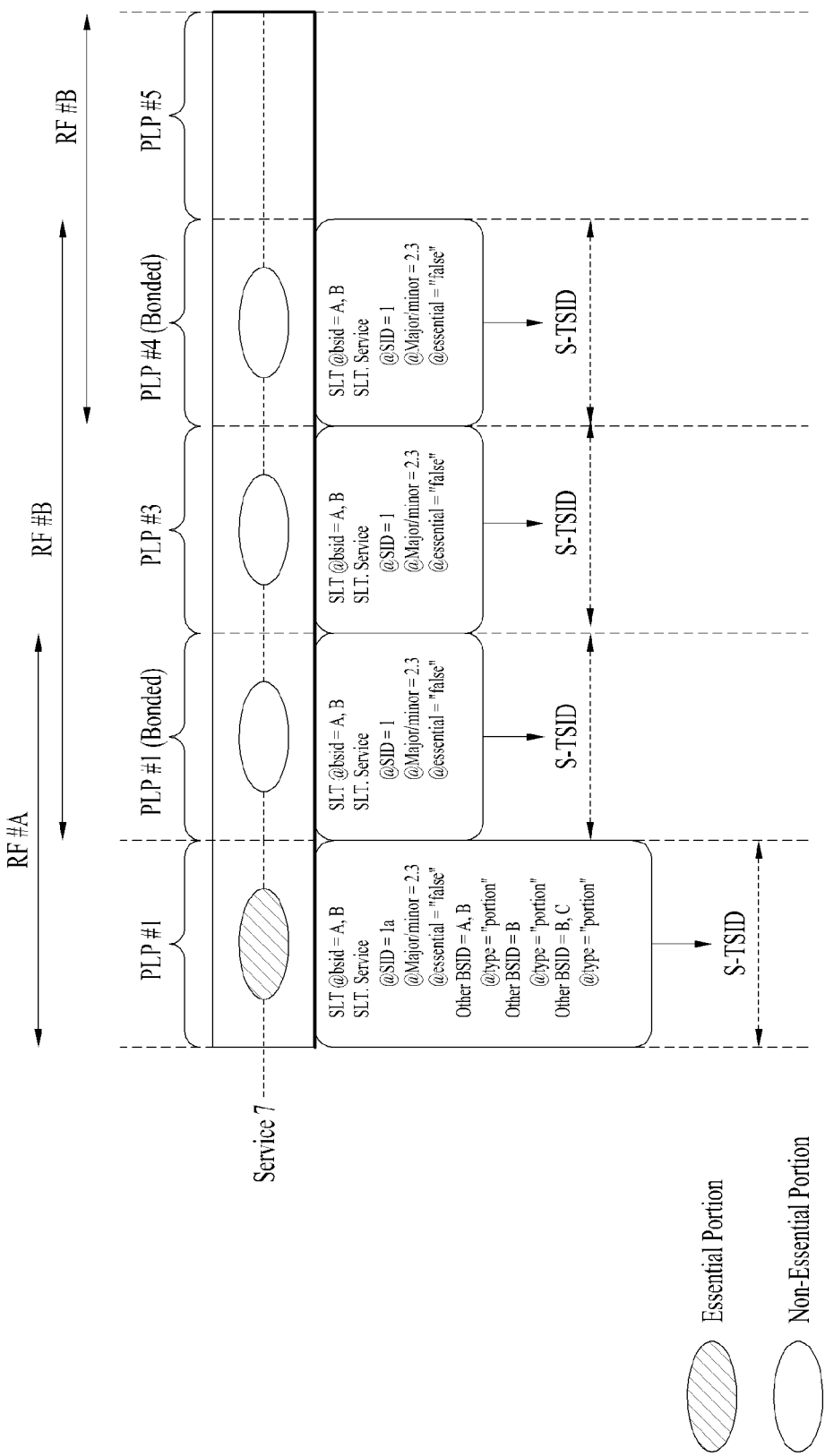
FIG. 19 is a diagram illustrating a channel bonding and multi-channel transmission method for service 7.

FIG. 19 illustrates a channel bonding and multi-channel transmission method for service 7.

Service 7 is an embodiment of a service transmitted in three channels. The number of channels delivering a service is not limited to 2 or 3 described in the present invention, and the format of signaling information may be extended and applied accordingly in a similar manner.

In service 7, an essential portion may be transmitted in PLP #1 of channel A, a non-essential portion may be transmitted in bonded PLP #2 of channels A and B, a non-essential portion may be transmitted in PLP #3 of channel B, and a non-essential portion may be transmitted in bonded PLP #4 of channels B and C. A different service transmission configuration may be configured for each service.

An SLT of channel A includes an SID, a channel number, and essential information, for BSID=A, and OtherBSID information and type information for BSIDs (A&B, B, and B&C) associated with split transmission of the service. An SLT included in bonded PLP #2 of channels A and B includes an SID, a channel number, and essential information, for BSID=A&B. Since the service transmitted in the bonded PLP is not an essential portion, OtherBSID information may be omitted.

An SLT included in PLP #3 of channel B includes an SID, a channel number, and essential information, for BSID=A&B. Since the service transmitted in PLP #3 is not an essential portion, OtherBSID information may be omitted.

An SLT included in bonded PLP #4 of channels B and C includes an SID, a channel number, and essential information, for BSID=B&C. Since the service transmitted in the bonded PLP is not an essential portion, OtherBSID information may be omitted.

Figure 20:
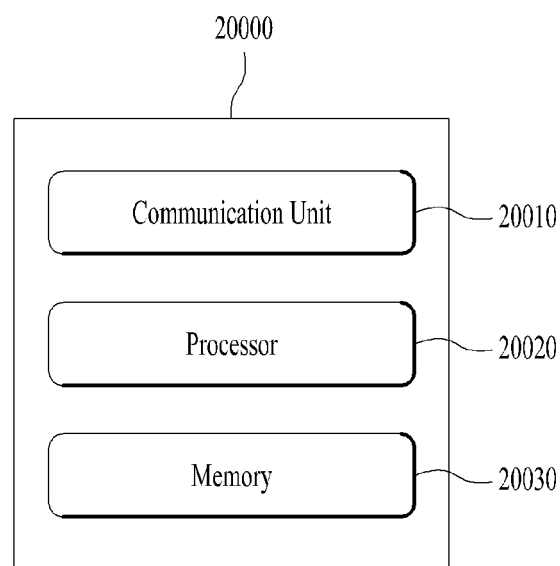
FIG. 20 is a block diagram illustrating a configuration of a broadcast signal transmission/reception apparatus according to an embodiment of the present invention.

FIG. 20 is a block diagram of a broadcast signal transmission/reception apparatus according to an embodiment of the present invention.

In FIG. 20, a broadcast signal transmission/reception apparatus 20000 may include a communication unit 20010, a processor 20020, and a memory 20030.

The communication unit 20010 may be coupled to the processor 20020 and transmit/receive a broadcast signal. The communication unit 20010 of the broadcast signal transmission apparatus may upconvert the frequency of data received from the processor 20020 to a transmission/reception band, and transmit the upconverted signal. The communication unit 20010 of the broadcast signal reception apparatus may downconvert the frequency of received data, and transmit the downconverted signal to the processor 20020. The communication unit 20010 may receive an audio/video signal wiredly. The communication unit 20010 may include at least one of a communication unit for wireless communication or a communication unit for wired communication. The communication unit 20010 may perform physical layer processing described with reference to FIG. 8. In an embodiment, the communication unit 20010 may perform link layer processing described with reference to FIGS. 6 and 7.

The processor 20020 may be coupled to the communication unit 20010 and implement a broadcast signal processing technology for an ATSC 3.0 system. The processor 20020 may be configured to perform operations according to various embodiments of the present invention based on the afore-described drawings and the foregoing description. Further, a module that implements the operations of the broadcast signal transmission/reception apparatus 20000 according to various embodiments of the present invention may be stored in the memory 20030 and executed by the processor 20020.

The memory 20030 is coupled to the processor 20020, and stores various types of information to operate the processor 20020. The memory 20030 may be included in the processor 20020, or may reside outside the processor 20020, connected to the processor 20020 by a known means. A specific configuration of the broadcast signal transmission/reception apparatus 20000 may be realized such that the foregoing various embodiments of the present invention are applied independently or two or more thereof are applied simultaneously.

A broadcast signal transmission method and a broadcast signal reception method of the broadcast signal transmission/reception apparatus 20000 will be described below. The broadcast signal transmission apparatus may be referred to as a broadcast signal transmitter, and the broadcast signal reception apparatus may be referred to as a broadcast signal receiver.

Figure 21:
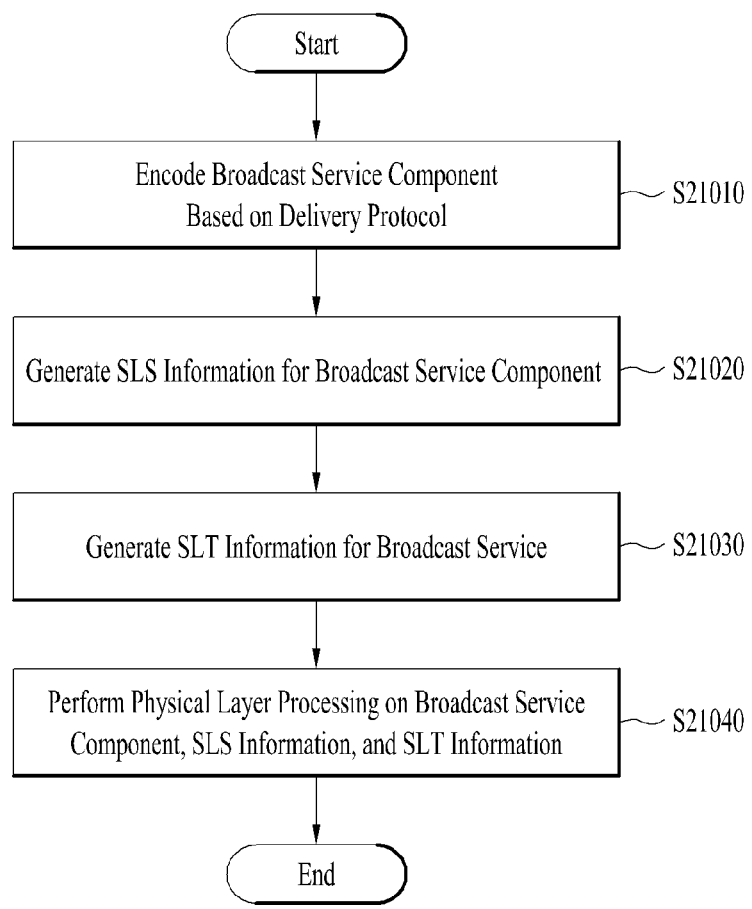
FIG. 21 is a flowchart illustrating a broadcast signal transmission method according to an embodiment of the present invention.

FIG. 21 is a flowchart illustrating a broadcast signal transmission method according to an embodiment of the present invention.

Various embodiments of broadcast signal transmission, described before with reference to FIGS. 1 to 20 are applicable to the broadcast signal transmission method of FIG. 21.

The broadcast signal transmitter may encode a component of a broadcast service based on a delivery protocol (S21010). The delivery protocol may include at least one of real-time object delivery over unidirectional transport (ROUTE) or MPEG media transport (MMT).

The broadcast signal transmitter may generate SLS information for the broadcast service component (S21020). The SLS information includes information for discovering and acquiring at least one component of the broadcast service.

The broadcast signal transmitter may generate SLT information for the broadcast service (S21030). The SLT information includes bootstrap information for acquiring the SLS information.

The broadcast signal transmitter may perform physical layer processing on the broadcast service component, the SLS information, and the SLT (S21040).

The broadcast service may include a plurality of components, and the plurality of components may be transmitted in multiple channels. A set of the components may correspond to an essential portion that enables a presentation of the service, a non-essential portion that is not sufficient to make a presentation of the service, or a duplicate of the service.

The SLT information may include BSID information for a channel delivering the SLT information, and service information delivered in a broadcast stream of the channel. The service information includes a service ID identifying the service, information about a channel number of the service, and essential information indicating whether a portion of the service delivered in the broadcast stream is essential, when the service is transmitted in multiple RF channels. Further, the service information includes OtherBSID information identifying another broadcast stream in which another portion of the broadcast service is transmitted, and the OtherBSID information includes type information indicating whether a set of components delivered in the other broadcast stream is a service portion or a service duplicate.

The physical layer processing may include channel bonding in which one PLP including a component is distributedly transmitted in a plurality of channels. In an embodiment, data of one PLP may be transmitted in first and second channels. A broadcast signal transmitted in the first channel may include a bonded part and a non-bonded part.

If the essential portion of the service is delivered in the non-bonded part of the broadcast signal, SLT information of the bonded part and SLT information of the non-bonded part may describe the service. If the essential portion of the service is delivered in the bonded part of the broadcast signal, only the SLT information of the bonded part may describe the service. Only when the SLT information describes the essential portion, the OtherBSID information may be included in the SLT.

Figure 22:
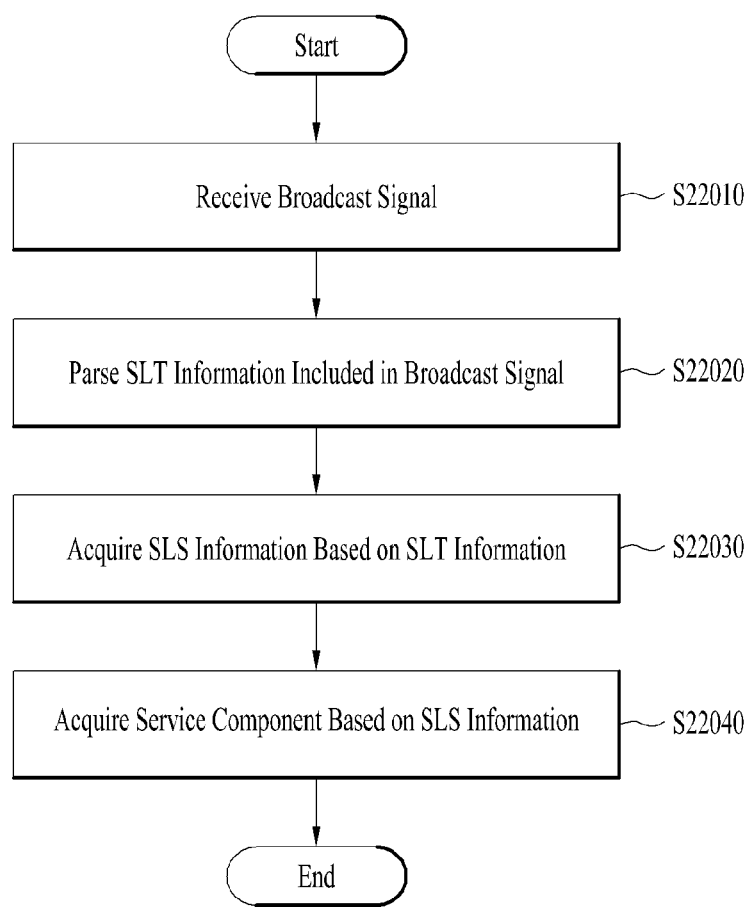
FIG. 22 is a flowchart illustrating a broadcast signal reception method according to an embodiment of the present invention.

FIG. 22 is a flowchart illustrating a broadcast signal reception method according to an embodiment of the present invention.

Various embodiments of broadcast signal reception, described before with reference to FIGS. 1 to 20 are applicable to the broadcast signal reception method of FIG. 22.

The broadcast signal receiver may receive a broadcast signal (S22010). The broadcast signal receiver may be tuned to a specific channel and receive a broadcast signal in the specific channel, and may simultaneously be tuned to a plurality of channels and receive a plurality of broadcast streams in the plurality of channels. Additionally, the broadcast signal receiver may perform physical layer processing on the received broadcast signal.

The broadcast signal receiver may parse SLT information included in the received broadcast signal (S22020). The SLT information includes bootstrap information for acquiring SLS information.

The broadcast signal receiver may acquire SLS information based on the SLT information (S22030). The SLS information includes information for discovering and acquiring at least one component of a broadcast service.

The broadcast signal receiver may acquire a service component based on the SLS information (S22040).

The broadcast signal receiver may decode the component of the broadcast service based on a delivery protocol. The delivery protocol may include at least one of ROUTE or MMT.

The broadcast service may include a plurality of components, and the plurality of components may be received in multiple channels. A set of the components may correspond to an essential portion that enables a presentation of the service, a non-essential portion that is not sufficient to make a presentation of the service, or a duplicate of the service.

The SLT information may include BSID information for a channel delivering the SLT information, and service information delivered in a broadcast stream of the channel. The service information includes a service ID identifying the service, information on a channel number of the service, and essential information indicating whether a portion of the service delivered in the broadcast stream is essential, when the service is transmitted in multiple RF channels. Further, the service information includes OtherBSID information identifying another broadcast stream in which another portion of the broadcast service is transmitted, and the OtherBSID information includes type information indicating whether a set of components delivered in the other broadcast stream is a service portion or a service duplicate.

The physical layer processing may include recovering bonded PLPs received in a plurality of channels to one PLP, and processing the PLP. In an embodiment, data of one PLP may be received in first and second channels. A broadcast signal transmitted in the first channel may include a bonded part and a non-bonded part.

If the essential portion of the service is delivered in the non-bonded part of the broadcast signal, SLT information of the bonded part and SLT information of the non-bonded part may describe the service. If the essential portion of the service is delivered in the bonded part of the broadcast signal, only the SLT information of the bonded part may describe the service. Only when the SLT information describes the essential portion, the OtherBSID information may be included in the SLT.

The present invention proposes a signaling method for transmitting and receiving a service in multiple channels. The present invention proposes a method of signaling an additional service for a service and a component such as a duplicate in one service. Therefore, various services may be transmitted in a plurality of channels. A receiver may acquire various portions/duplicates corresponding to a service, using signaling information.

When channel bonding is applied to a broadcast signal, the receiver needs signaling information for a channel-bonded part. However, it is preferable to minimize unnecessary signaling information. Accordingly, when channel bonding is applied, a signaling configuration is determined based on what carries an essential portion in the present invention. In conclusion, the present invention may provide a signaling configuration that optimizes a broadcast signal configuration according to multi-channel transmission and channel bonding.

Each step described in the foregoing embodiments may be performed by hardware/processors. Each module/block/unit described in the foregoing embodiments may operate in hardware/as a processor. Further, the methods provided by the present invention may be executed as code. The code may be written to a processor-readable storage medium, and thus read by a processor of an apparatus.

While the drawings have been described separately for the convenience of description, it is possible to implement a new embodiment by combining the embodiments illustrated in the drawings. The apparatuses and methods according to the present invention are not intended to limit the configurations and methods of the foregoing embodiments. Rather, all or a part of the embodiments may be selectively combined so that many modifications are made to the embodiments.

While preferred embodiments of the present invention have been described above, the present invention is not limited to the specific embodiments. Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

Those skilled in the art will understand that many variations and modifications can be made to the present invention. Therefore, the present invention is intended to embrace modifications and variations within the scope of the appended claims and their equivalents.

In the specification, both a device invention and a method invention are mentioned, and their descriptions are applicable complementarily.

MODE FOR CARRYING OUT THE INVENTION

Various embodiments have been described in the best mode for carrying out the invention.

INDUSTRIAL APPLICABILITY

The present invention is used in the field of broadcast signal transmission/reception.

It is obvious to those skilled in the art that many modifications and variations may be made to the disclosure within the scope and spirit of the invention. Accordingly, it is to be understood that the disclosure is intended to embrace various modifications and variations falling within the scope of the appended claims and their equivalents.

The invention claimed is:

1. A method of transmitting broadcast signals by a broadcast signal transmission apparatus, comprising:
processing service components for a service, signaling information for the service to generate the broadcast signals including multiple PLPs,
wherein the signaling information includes a first BSID representing a first broadcast stream in which a first set of components of the service is delivered, a service ID representing the service and other BSID information,
the other BSID information includes a second BSID representing a second broadcast stream for the service and type information representing a type of a second set of components delivered in the second broadcast stream,
the type of the second set of components is either a portion of the service components for the service or a duplicate of the service components for the service; and
transmitting the broadcast signals via one or more RF channels.

2. The method of claim 1, wherein
a first broadcast signal transmitted via a first RF channel includes a first PLP,
a second broadcast signal transmitted via a second RF channel includes a second PLP,
wherein the first PLP and the second PLP are identified by a same PLP identifier,
the first broadcast stream is delivered in the first broadcast signal via the first RF channel and
the second broadcast stream is delivered in the second broadcast signal via the second RF channel.

3. The method of claim 2, wherein
in response to delivering the first set of components, that is an essential portion of the service, in the first PLP, the first BSID further represents the second broadcast stream, the signaling information further includes essential information representing that the first set of components in the first broadcast stream is the essential portion of the service, the type information represents that the type of the second set of components delivered in the second broadcast stream is the portion of the service, wherein the service information further includes address information to access S-TSID information which is used to obtain the service components for the service, the S-TSID information is delivered in the first PLP.

4. The method of claim 2, wherein the first broadcast signal further includes a third PLP which is identified by a PLP identifier different from the PLP identifier identifying the first PLP and the second PLP, in response to delivering the first set of components, that is essential portion of the service, in the third PLP, the signaling information further includes essential information representing that the first set of components in the first broadcast stream is the essential portion of the service, the second BSID further represents the first broadcast stream, the type information represents that the type of the second set of components delivered in the second broadcast stream is the portion of the service.

5. The method of claim 4, wherein the first broadcast signal further includes second signaling information for the service, the second signaling information includes the second BSID, the service ID and essential information representing that the second set of components is not the essential portion of the service.

6. The method of claim 5, wherein the second service information further includes address information to access S-TSID information which is used to obtain the second set of components for the service, the S-TSID information is delivered in the first PLP.

7. The method of claim 5, wherein the other BSID information further includes:

a third BSID representing the second broadcast stream delivering a third set of components, and type information representing a type of the third set of components delivered in the second broadcast stream, the type of the third set of components is a portion of the service components for the service.

8. A device for processing broadcast signals, the device comprising:

a tuner configured to receive the broadcast signals via multiple RF channels, the broadcast signals including service components for a service and signaling information for the service delivered in multiple PLPs, wherein the signaling information includes a first BSID representing a first broadcast stream in which a first set of components of the service is delivered, a service ID representing the service and other BSID information, the other BSID information includes a second BSID representing a second broadcast stream for the service and type information representing a type of a second set of components delivered in the second broadcast stream, the tripe of the second set of components is either a portion of the service components for the service or a duplicate of the service components for the service; and a demodulator configured to demodulate the broadcast signals.

9. The device of claim 8, wherein the tuner is further configured to receive a first broadcast signal transmitted via a first RF channel including a first PLP and a second broadcast signal transmitted via a second RF channel including a second PLP, wherein the first PLP and the second PLP are identified by a same PLP identifier, the first broadcast stream is delivered in the first broadcast signal via the first RF channel, and the second broadcast stream is delivered in the second broadcast signal via the second RF channel.

10. The device of claim 9, wherein the signaling information further includes essential information representing that the first set of components, that is delivered in the first PLP, is an essential portion of the service and address information to access S-TSID information delivered in the first PLP which is used to obtain the service components for the service and the type information represents that the type of the second set of components is the portion of the service.

11. The device of claim 10, wherein, in response to the signaling information, the device is configured to obtain the service components for the service based on the signaling information.

12. The device of claim 9, wherein:

the first broadcast signal further includes a third PLP which is identified by a PLP, identifier different from the PLP identifier identifying the first PLP and the second PLP, the signaling information further includes essential information representing that the first set of components, that is delivered in the third PLP, is the essential portion of the service, the second BSID further represents the first broadcast stream, the type information represents that the type of the second set of components delivered in the second broadcast stream is the portion of the service.

13. The device of claim 12, wherein the first broadcast signal further includes a second signaling information for the service, the second signaling information includes the second BSID, the service ID and essential information representing that the second set of components is not the essential portion of the service.

14. The device of claim 13, wherein the other BSID information further includes:

a third BSID representing the second broadcast stream delivering a third set of components, and type information representing a type of the third set of components delivered in the second broadcast stream, the type of the third set of components is a portion of the service components for the service.

15. The device of claim 14, wherein, in response to the signaling information, the device is configured to obtain the service components for the service based on the signaling information and the second signaling information.

* * * * *